(12) United States Patent
Fini

(10) Patent No.: US 7,783,149 B2
(45) Date of Patent: Aug. 24, 2010

(54) LARGE-MODE-AREA OPTICAL FIBERS WITH REDUCED BEND DISTORTION

(75) Inventor: John Michael Fini, Jersey City, NJ (US)

(73) Assignee: Furukawa Electric North America, Inc., Norcross, GA (US)

( * ) Notice: Subject to any disclaimer, the term of this patent is extended or adjusted under 35 U.S.C. 154(b) by 61 days.

(21) Appl. No.: 12/072,574

(22) Filed: Feb. 27, 2008

(65) Prior Publication Data

US 2009/0059353 A1 Mar. 5, 2009

Related U.S. Application Data

(63) Continuation-in-part of application No. 11/319,121, filed on Dec. 27, 2005, now Pat. No. 7,764,854.

(60) Provisional application No. 60/893,048, filed on Mar. 5, 2007.

(51) Int. Cl.
*G02B 6/02* (2006.01)
*G02F 1/295* (2006.01)

(52) U.S. Cl. .......................... 385/123; 385/124; 372/6

(58) Field of Classification Search .................. 385/123
See application file for complete search history.

(56) References Cited

U.S. PATENT DOCUMENTS

| | | | |
|---|---|---|---|
| 3,989,350 A | 11/1976 | Cohen et al. | |
| 4,106,847 A | 8/1978 | Arnaud | 385/124 |
| 4,302,231 A | 11/1981 | Macedo et al. | |
| 4,519,826 A | 5/1985 | Tran | |
| 5,018,811 A | 5/1991 | Haavisto et al. | 385/130 |
| 5,600,738 A | 2/1997 | Bergland et al. | 385/11 |
| 5,781,684 A | 7/1998 | Liu | 385/124 |
| 5,963,700 A | 10/1999 | Kato et al. | |
| 6,275,636 B1 | 8/2001 | Liu et al. | 385/124 |

(Continued)

OTHER PUBLICATIONS

U.S. Appl. No. 11/818,780, J. M. Fini (Case 5); filed Jun. 15, 2007.

(Continued)

*Primary Examiner*—Uyen-Chau N Le
*Assistant Examiner*—Kajli Prince
(74) *Attorney, Agent, or Firm*—Michael J. Urbano; Michael A. Morra; Ann M. LaFeir

(57) ABSTRACT

In a LMA optical fiber the index of the core region is graded (i.e., as viewed in a radial cross-section) and has a grading depth of $\Delta n_g$, as measured from a central maximum at or near the axis to a lower level that is not greater than the central maximum and not less than the index of the cladding region. When the fiber is to be bent at a bend radius, the grading depth, the radius of the core region, and the difference between the central maximum index and the cladding region index are configured to reduce bend distortion. They may also advantageously be configured to maximize the effective mode-field area of the fundamental mode, suppress higher order modes, and reduce bend loss. In a preferred embodiment, the core region includes a centralized gain region, which in turn includes a dark region that is no more than 30% of the area of the gain region. Also described is a method of making such LMA fibers.

11 Claims, 19 Drawing Sheets

U.S. PATENT DOCUMENTS

| | | | |
|---|---|---|---|
| 6,301,422 | B1 | 10/2001 | Li |
| 6,321,016 | B1 | 11/2001 | Tirboni et al. |
| 6,351,588 | B1 | 2/2002 | Bhatia et al. ............... 385/123 |
| 6,363,191 | B1 | 3/2002 | Gillham et al. .............. 385/48 |
| 6,477,297 | B1 | 11/2002 | DeMiritt et al. |
| 6,614,975 | B2 | 9/2003 | Richardson et al. |
| 6,717,721 | B2 | 4/2004 | Kent et al. |
| 6,728,439 | B2 | 4/2004 | Weisberg et al. ............. 385/28 |
| 6,771,865 | B2 * | 8/2004 | Blaszyk et al. ............. 385/127 |
| 6,801,699 | B1 | 10/2004 | Bickham et al. |
| 7,171,074 | B2 | 1/2007 | DiGiovanni et al. .......... 385/28 |
| 2004/0037497 | A1 | 2/2004 | Lee ............................. 385/28 |
| 2004/0052484 | A1 | 3/2004 | Broeng et al. |
| 2004/0101230 | A1 | 5/2004 | Philebrown |
| 2005/0024716 | A1 | 2/2005 | Nilsson et al. ......... 359/341.31 |
| 2005/0157998 | A1 | 7/2005 | Dong et al. |
| 2007/0147751 | A1 | 6/2007 | Fini ........................... 385/123 |

OTHER PUBLICATIONS

J. M. Fini, "Design of large-mode-area amplifier fibers resistant to bend-induced distortion," *J. Opt. Soc. Am. B*, vol. 24, pp. 1669-1676 (Aug. 2007).

J. M. Fini, "Bend-resistant design of conventional and microstructure fibers with very large mode area," *Opt. Express*, vol. 14, No. 1, pp. 69-81 (Jan. 2006).

J. M. Fini, "Bend-compensated design of large-mode-area fibers," *Opt. Lett.*, vol. 31, pp. 1963-1965 (Jul. 2006).

J. M. Fini, "Intuitive modeling of bend-distortion in large-mode-area fibers," *Opt. Lett.*, vol. 32, pp. 1632-1634 (Jun. 2007).

J. M. Fini and S. Ramachandran, "Natural bend-distortion immunity of higher-order-mode large-mode-area fibers," *Opt. Lett.*, vol. 32, pp. 748-750 (Apr. 2007).

J. M. Fini and S. Ramachandran, "Bend resistance of large-mode-area higher-order-mode fibers," in *Lasers and Electro-Optics Society Summer Topical Meeting* (IEEE, Jul. 2006), paper MC1.3.

A. Galvanauskas, "Mode-scalable fiber-based chirped pulse amplification systems," *IEEE J. Sel. Top. Quantum Electron.*, vol. 7, pp. 504-517 (Jul./Aug. 2001).

C. C. Renaud, et al., "Characteristics of Q-switched cladding-pumped ytterbium-doped fiber lasers with different high-energy fiber designs," *IEEE J. Quantum Electron*, vol. 37, pp. 199-206 (2001).

S. Ramachandran, et al., "Light propagation with ultra-large modal areas in optical fibers," *Opt. Lett.*, vol. 31, pp. 1797-1799 (Jun. 2006).

P. Wang, et al., "Efficient single-mode operation of a cladding-pumped ytterbium-doped helical-core fiber laser," *Opt. Lett.*, vol. 31, pp. 226-228 (Jan. 2006).

W. S. Wong, et al., "Breaking the limit of maximum effective area for robust single-mode propagation in optical fibers," *Opt. Lett.*, vol. 30, pp. 2855-2857 (Nov. 2005).

L. Zenteno, et al., "Suppression of Raman gain in single-transverse-mode dual-hole-assisted fiber," *Opt. Express*, vol. 13, pp. 8921-8926 (Oct. 2005).

7. C. J. S. de Matos, et al., "All-fiber chirped pulse amplification using highly-dispersive air-core photonic bandgap fiber," *Opt. Express*, vol. 11, pp. 2832-2837 (Nov. 2003).

K. Furusawa, et al., "Cladding pumped ytterbium-doped fiber laser with holey inner and outer cladding," *Opt. Express*, vol. 9, pp. 714-720 (Dec. 2001).

J. C. Baggett, et al., "Understanding bending losses in holey optical fibers," *Opt. Commun.* vol. 227, pp. 317-335 (2003).

J. Nilsson, et al., "Yb3+-ring-doped fiber for high-energy pulse amplification," *Opt. Lett.*, vol. 22, pp. 1092-1094 (Jul. 1997).

J. J. Plant, J. T. et al., "250 mW, 1.5 m monolithic passively mode-locked slab-coupled optical waveguide laser," *Opt. Lett.*, vol. 31, pp. 223-225 (Jan. 2006).

J. M. Oh, et al., "Increased pulsed amplifier efficiency by manipulating the fiber dopant distribution," in *Conference on Lasers and Electro-optics* (Optical Society of America, May 2006), paper CTuQ3 (two pages).

M.-Y. Cheng, et al., "High energy and high-peak-power nanosecond pulse generation with beam quality control in 200-µm core highly multimode Yb-doped fiber amplifiers," *Opt. Lett.*, vol. 30, pp. 358-360 (Feb. 2005).

E. Desurvire, et al., "Design optimization for efficient erbium-doped fiber amplifiers," *J. Lightwave Technol.*, vol. 8, pp. 1730-1741 (Nov. 1990).

* cited by examiner

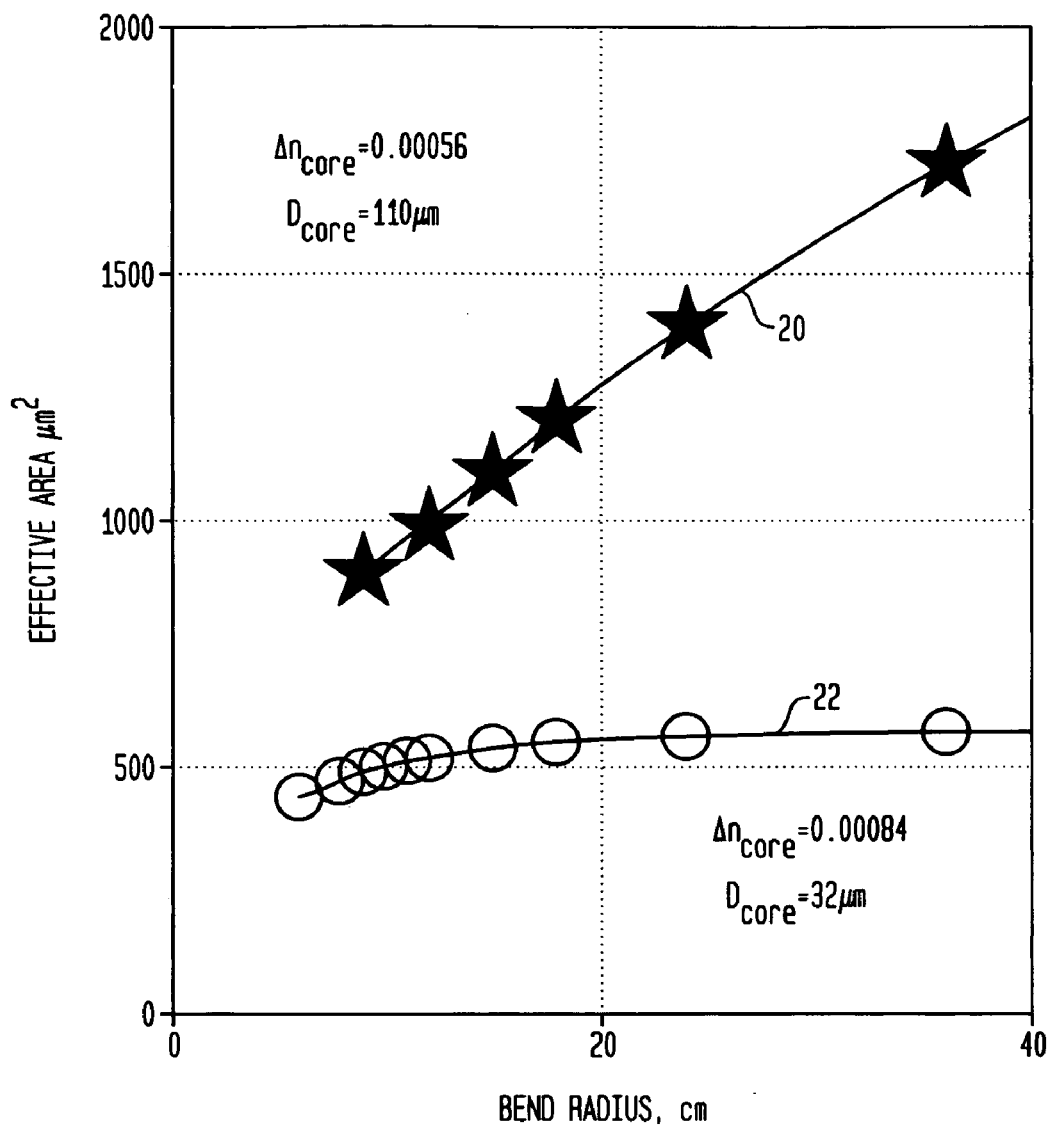

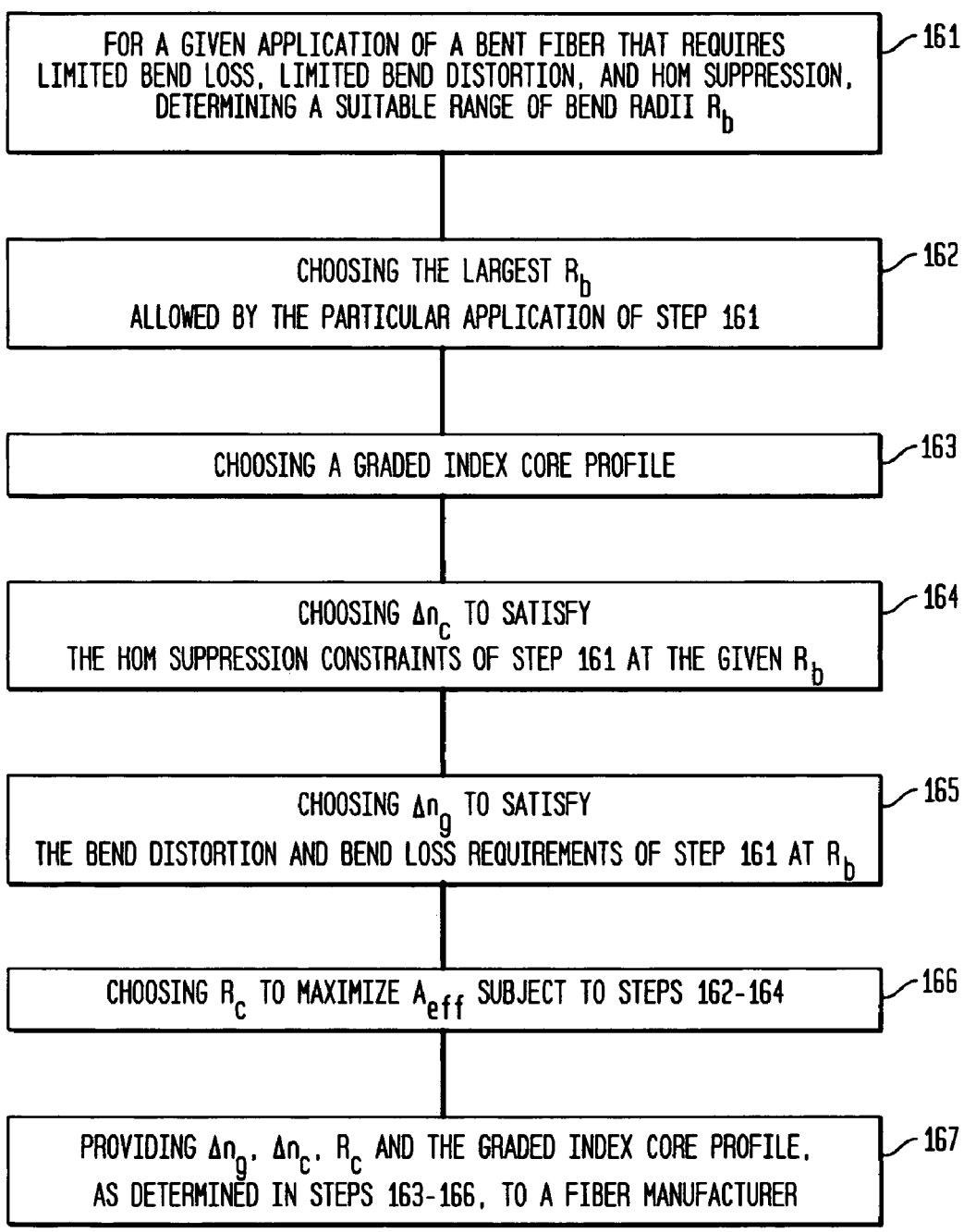

METHOD 170

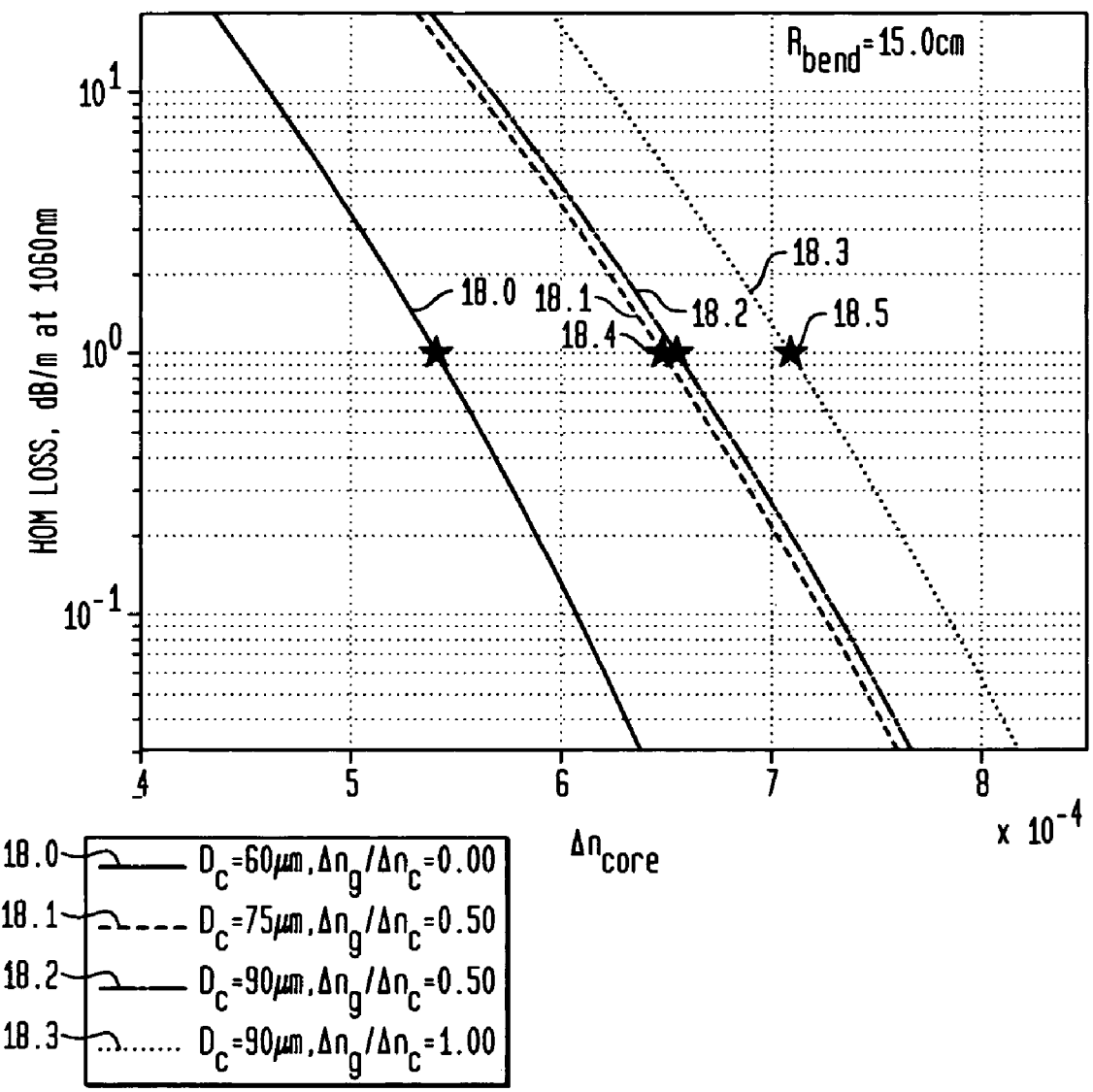

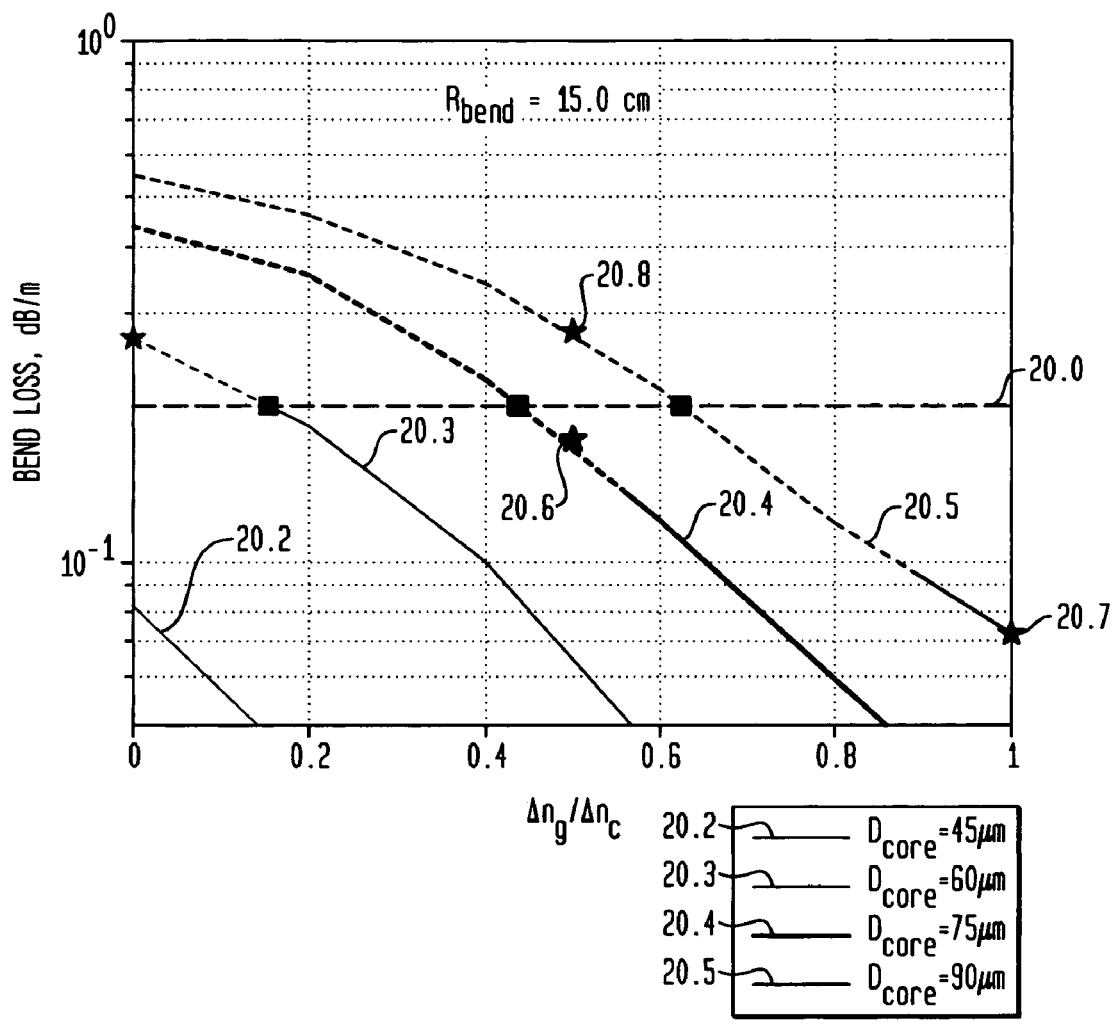

LARGE-MODE-AREA OPTICAL FIBERS WITH REDUCED BEND DISTORTION

CROSS-REFERENCE TO RELATED APPLICATIONS

This application claims priority from provisional application Ser. No. 60/893,048, which was filed on Mar. 5, 2007 and is entitled "Large-Mode-Area Fibers."

This application is also a continuation-in-part of application Ser. No. 11/319,121 (Fini 2), which was filed on Dec. 27, 2005 and is entitled "Optical Fiber with Specialized Index Profile to Compensate for Bend-Induced Distortion."

GOVERNMENT CONTRACT

This invention was made with Government support under the Advanced Technology Program of the National Institute of Standards and Technology, Award No. 70NANB41H3035. The Government has certain rights in this invention.

BACKGROUND OF THE INVENTION

1. Field of the Invention

This invention relates to optical fibers and, more particularly, to large-mode-area (LMA) optical fibers with reduced bend distortion.

2. Discussion of the Related Art

The ever increasing demand for higher optical power output from fiber amplifiers and lasers has stimulated extensive research and development, pushing the limits of fiber design. Better fibers are key to improving amplifier performance, and LMA designs in particular increase power allowed in the face of limitations imposed by nonlinear effects [e.g., A. Galvanauskas, *IEEE J. Sel. Top. Quantum Electron.*, Vol. 7, pp. 504-517 (2001) and C. C. Renaud et al., *IEEE J. Quantum Electron.*, Vol. 37, pp. 199-206 (2001), both of which are incorporated herein by reference]. To move beyond conventional performance, researchers have refined fabrication limits, tested traditional assumptions, and explored various design approaches [e.g., S. Ramachandran et al., *Opt. Lett.*, Vol. 31, pp. 1797-1799 (Jun. 15, 2006); P. Wang, et al., *Opt. Lett.*, Vol. 31, pp. 226-228 (Jan. 15, 2006); W. S. Wong, et al., *Opt. Lett.*, Vol. 30, pp. 2855-2857 (2005); L. Zenteno, et al., *Opt. Express*, Vol. 13, pp. 8921-8926 (2005); C. J. S. de Matos, *Opt. Express*, Vol. 11, pp. 2832-2837 (2003), and K. Furusawa, et al., *Opt. Express*, Vol. 9, pp. 714-720 (2001), all of which are incorporated herein by reference].

One of the assumptions implicit in conventional fiber amplifier/laser designs is that a bent gain fiber experiences macrobending loss (for bends with relatively constant curvature along the fiber length) and mode coupling (for microbends or bend transitions with more variable curvature along the fiber length) but sees no other impact important to amplifier performance. Distortion of the optical mode profile in response to a fiber bend is known [e.g., J. C. Baggett, et al., *Opt. Commun.*, Vol. 227, pp. 317-335 (2003), which is incorporated herein by reference] but generally has been neglected in amplifier fiber design and characterization. This assumption eventually breaks down as core size increases, and the current aggressive push to larger mode area has already put amplifier designs in a regime where bend distortion must be considered.

In fact, simply bending a fiber onto a spool of any reasonable package size produces large bend distortion for conventional fibers with core diameter ~50 µm or greater. Because this distortion reduces the effective mode area, it directly impacts amplifier performance and partially defeats the purpose of using a large area core to begin with. The realization that bend distortion is of growing importance highlights the difficulty of making extremely large mode area fibers practical, and qualitatively it changes the design strategies needed to get good performance. Naturally, one solution to the bend distortion problem is to keep the fiber straight, but this approach may be impractical for many applications, especially when fiber lengths are one meter or more.

Thus, a need remains in the art for a method of making a LMA fiber that effectively reduces bend distortion.

To the extent that the prior art workers have considered bend distortion they have generally done so in a limited way, ignoring how it adversely impacts the interaction between the gain region and the signal light to be amplified.

Thus, there is also a need for a gain-producing LMA fiber that not only effectively reduces bend distortion but also preserves the interaction between the signal light and the gain region.

BRIEF SUMMARY OF THE INVENTION

My analysis of the impact of bend distortion demonstrates that it not only reduces effective transverse mode area in LMA optical fibers but also significantly degrades the interaction of the fundamental transverse mode with the gain region in gain-producing LMA fibers. This interaction is quantified using conventional gain-overlap integrals and also using a measure of energy extraction from the gain by the signal mode. A fiber having a graded-index core, designed according to my distortion-resistant strategy, is shown herein to have far better performance according to these gain-interaction metrics and, in addition, according to loss and mode-coupling indicators.

Hereinafter when the term mode is used it will be understood to mean transverse mode, and when the term index is used, it will be understood to mean refractive index.

In accordance with one aspect of my invention, a LMA optical fiber comprises a core region having a longitudinal axis, and a cladding region surrounding the core region, the core and cladding regions configured to support and guide the propagation of signal light in a fundamental transverse mode (at a particular wavelength) in the core region in the direction of the axis. The index of the core region is graded (i.e., as viewed in a radial cross-section) to a depth ($\Delta n_g$), as measured from a central maximum at or near the axis to a lower level that is not greater than the central maximum and not less than the index of the cladding region. When the fiber is to be bent at a bend radius ($R_b$), the grading depth ($\Delta n_g$), the radius of the core region ($R_c$), and the difference between the central maximum index and the cladding region index ($\Delta n_c$) are configured to reduce bend distortion. In a preferred embodiment, they are also advantageously configured to maximize the effective mode-field area ($A_{eff}$) of the fundamental mode, suppress higher order modes (HOMs), and reduce bend loss.

In accordance with another aspect of my invention, a method of fabricating a low-bend-distortion LMA optical fiber to be bent at a radius $R_b$ comprises the steps of: (1) choosing the largest $R_b$ allowed by the particular application that includes use of the fiber; (2) choosing a particular graded-index profile for the core region; (3) choosing $\Delta n_c$ to satisfy HOM suppression requirements; (4) choosing $\Delta n_g$ to satisfy bend distortion and bend loss requirements at $R_b$; (5) choosing $R_c$ to maximize $A_{eff}$ subject to steps (1)-(4); and (6) providing $\Delta n_g$, $\Delta n_c$, $R_c$ and the graded-index profile, as determined by steps (2)-(5), to a fiber manufacturer.

In accordance with another preferred embodiment of my LMA fiber, the core region includes a centralized gain-producing region of radius $R_g<R_c$, and $\Delta n_g$ and $R_g$ are also chosen to meet gain interaction requirements.

BRIEF DESCRIPTION OF THE SEVERAL VIEWS OF THE DRAWING

My invention, together with its various features and advantages, can be readily understood from the following more detailed description taken in conjunction with the accompanying drawing, in which:

FIG. 2 is a graph of $A_{\it eff}$ vs. $R_b$ comparing SIFs with a moderately large core diameter (32 μm; curve 22) and an extremely large core diameter (110 μm; curve 20);

FIG. 5C is a simple schematic of the gain profile 16 and an optical mode profile 10c of a gain-producing fiber. (Note, profile 16 illustrates the boundary of the region of the core that contains gain dopants; it is not necessarily identical with the index profile 15 of the core region shown in FIGS. 5A & 5B.) The gain overlap is defined as the fraction of the optical power of a particular mode within the gain region (e.g., the area of the shaded portions of the fundamental mode 10a; FIG. 5A) compared to the total area under gain profile 16; FIG. 5A, which is the simplest indication of differential gain between different modes. The dark fraction of a gain profile is a complementary indicator, defined as the fraction of the gain region that sees too little signal-mode intensity (i.e., below threshold 18; FIG. 5C) for effective energy extraction;

FIG. 16 is a flow chart used in the description of a method of fabricating a LMA fiber having low bend distortion, in accordance with one embodiment of my invention;

FIG. 18 is a graph comparing simulated HOM loss vs. $\Delta n_c$ for a family of fibers having various $D_c$ and $\Delta n_g/\Delta n_c$: one SIF (curve 18.0) and three bend-resistant fibers (curves 18.1, 18.2, 18.3);

FIG. 20 is a graph of simulated bend loss vs. $\Delta n_g/\Delta n_c$ for different core diameters. Line 20.0 indicates a bend loss threshold of 0.2 dB/m;

Various ones of the foregoing figures are shown schematically in that they are not drawn to scale and/or, in the interests of simplicity and clarity of illustration, do not include all 5, of the details of an actual optical fiber or product depicted. In particular, the index and/or gain profiles of FIGS. 3B, 3C, 4A, 5A, 5B, 5C, 9A, and 9B are averages of the actual variations of index and/or gain that would be observable in an actual fiber.

DETAILED DESCRIPTION OF THE INVENTION

Optical Fibers—General Considerations

Figure 9A:
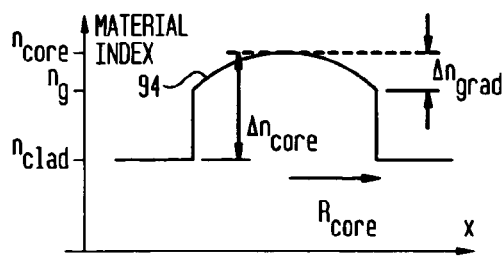
FIG. 9 is a simple schematic of the graded-index core region of a LMA fiber (FIG. 9C) in accordance with an illustrative embodiment of my invention, with FIG. 9A depicting the material index profile of a straight fiber and FIG. 9B depicting the equivalent index of a bent fiber.
Figure 9B:
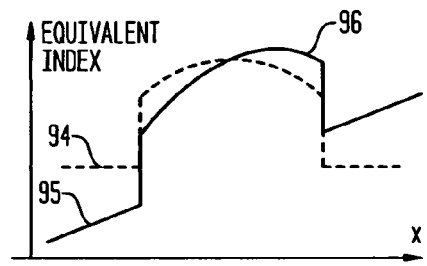
Figure 9C:
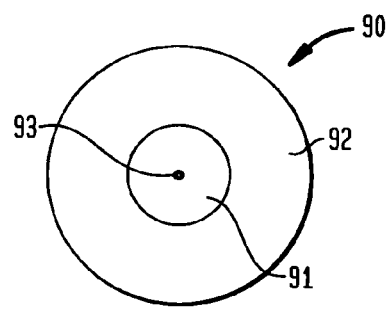

Turning now to FIG. 9C, an optical fiber 90 comprises a core region 91 having a longitudinal axis 93 and a cladding region 92 surrounding the core region. The core region 91 and cladding region 92 are configured to support and guide the propagation of signal light in the core region in the direction of the axis. To this end, the index of the core region 91 ($n_{core}=n_c$) is greater than that of the cladding region 92 ($n_{clad}$). Preferably the core and cladding regions are configured to propagate light preferentially in the fundamental transverse mode at the center wavelength of the signal light. To this end, higher order modes (HOMs) may be suppressed by techniques well-known in the art; for example, by appropriate use of high bend loss, gain selectivity, or resonant coupling HOMs to a high-index ring. The latter is described by me in copending patent application Ser. No. 11/818,780 (Fini 5), which was filed on Jun. 15, 2007 and is entitled "Bend Sensitivity in Single-Mode Optical Fibers."

The term center wavelength of the signal light is intended to recognize the well-known phenomenon of line broadening; that is, no signal source emits light at precisely a single wavelength. Rather, all light sources emit at a center wavelength, where the intensity is typically maximum, as well as at lower intensities in a range of wavelengths extending on both sides of the center wavelength. This range is known as the linewidth. Hereinafter, we will simply refer to the signal wavelength, it being understood that such signals are inherently characterized by a non-zero linewidth.

The fiber itself may be a standard, non-gain producing fiber used in a variety of applications including, for example, transmission systems, access systems, sensor apparatus, motor vehicles, and the like. Alternatively, the fiber may be a gain-producing fiber, which finds application in, for example, fiber optic amplifiers and fiber optic lasers.

The core region 91 may be a single region, or it may be a composite of two or more different regions. These core regions may have, for example, different dopants, different indices, and/or, in the case of a gain-producing fiber, different optical gains. The cladding region 92 may also be a single region, or it may be a composite of two or more different regions (e.g., a double-clad configuration to provide pump light confinement in a typical fiber optic amplifier). As with the core region, these cladding regions may have, for example, different dopants and/or different indices. Thus, the cladding region 92 may comprise an inner cladding region and one or more outer cladding regions disposed radially outside of the inner cladding region. The outer cladding region may include, for example, a down-doped region (or trench), which has an index less than that of the inner cladding region, and/or an up-doped region (or ring), which has a index greater than that of the inner cladding region. Thus, when the inner cladding region is present, the index of the inner cladding region ($n_{clad}$) constitutes a frame of reference for the measurement of other index differences; to with, $\Delta n_c = n_{core} - n_{clad}$, which is often referred to as the contrast. On the other hand, if the inner cladding region is not present, then the index of the outer cladding region would constitute the frame of reference.

A typical optical fiber 90 is made of silica and one or more suitable dopants in particular regions. For example, the core region includes one or more dopants that increase its index above that of the outer cladding, which typically comprises essentially pure silica. Illustrative index-increasing dopants include Ge, Al and P. However, for reasons well known to those skilled in the art, the core region may also include one or more index-decreasing dopants such as F. Likewise certain portions of the inner cladding region may include one or more index-increasing dopants to form rings, and other portions of the inner cladding may include one or more index-decreasing dopants to form trenches. Some regions may include both index-increasing and index-decreasing dopants.

Alternatively, fiber 90 may also include one or more airholes, which are well known features used to lower the index of selected regions of the cladding or core.

Figure 5A:
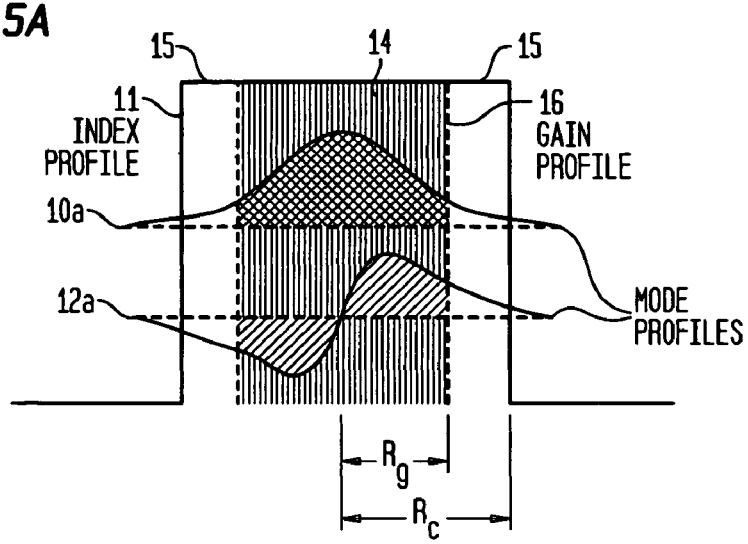
FIGS. 5A & 5B are schematic index profiles (and gain profiles) of the core region showing the position of the optical modes within the core region: centrally located for a straight SIF (FIG. 5A) and shifted toward an outer, peripheral region of the core for a bent fiber (FIG. 5B)

If the fiber is a gain-producing fiber, then the core region would also include at least one gain-producing dopant (e.g., a rare earth element or Cr). The gain-producing dopant may be distributed throughout the entire core region, or it may be confined to only a portion thereof. The latter embodiment is depicted in FIG. 5A, which shows the index profile 11 of a gain-producing fiber. The gain-producing dopants in this case are confined to an inner core region 14 of radius $R_g < R_c$, which defines the gain profile 16. The efficacy of this design will be discussed later.

Although the use of the term radius in the foregoing discussion implies that the cross-sections of the core regions are circular and/or annular, in practice these regions may be non-circular; for example, they may be elliptical, polygonal, or other more complex shapes. Nevertheless, as is common in the art, we use the term radius for simplicity and clarity.

In many high power applications it is important to prevent detrimental nonlinear effects from occurring in the signal light. To this end, fibers with large mode area (LMA) are often used. A LMA fiber has a relatively large mode-field diameter (MFD) or a relatively large mode-field area ($A_{eff}$). Those skilled in the art recognize that MFD and $A_{eff}$ are equivalent only when the mode field shape is essentially Gaussian. However, when the mode-field shape departs from strictly Gaussian, then the MFD is generally not a useful way to describe the diameter or cross-sectional area of the guided mode. In this case, the industry relies instead upon $A_{eff}$, which is given by:

$$A_{eff} = \frac{\left(\int |E|^2 dA\right)^2}{\int |E|^4 dA} \quad \text{(i)}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the MFD is an appropriate metric for the diameter of the mode and may be expressed as:

$$MFD = 2\sqrt{\frac{2\int |E|^2 dA^2}{\int \left|\frac{dE}{dr}\right|^2 dA}} \quad \text{(ii)}$$

where r is the radial coordinate. When the mode-field shape is exactly equal to an axisymmetric Gaussian function, then $A_{eff} = \pi \times MFD^2/4$.

Although LMA fibers advantageously reduce the effects of nonlinearities, they are disadvantageously more sensitive to bend distortion, which reduces the $A_{eff}$ and radially displaces and distorts the optical modes.

In a straight (unbent) LMA fiber $A_{eff}$ illustratively ranges from several 100 μm² to several 1000 μm², depending the particular fiber design, application, and/or operating wavelength. However, when a LMA fiber is sharply bent, $A_{eff}$ may be dramatically reduced; for example, as shown in FIG. 2 (curve 20), $A_{eff}$ of a LMA fiber ($D_{core}$=2$R_{core}$=110 μm) is reduced from about 1800 μm² at $R_b$~40 cm to about 800 μm² at $R_b$~10 cm, a reduction factor of about 2.3. Of course, the reduction would be even greater when compared to a straight fiber ($R_b$=∞), which illustratively has $A_{eff}$~5300 μm².

Figure 5B:
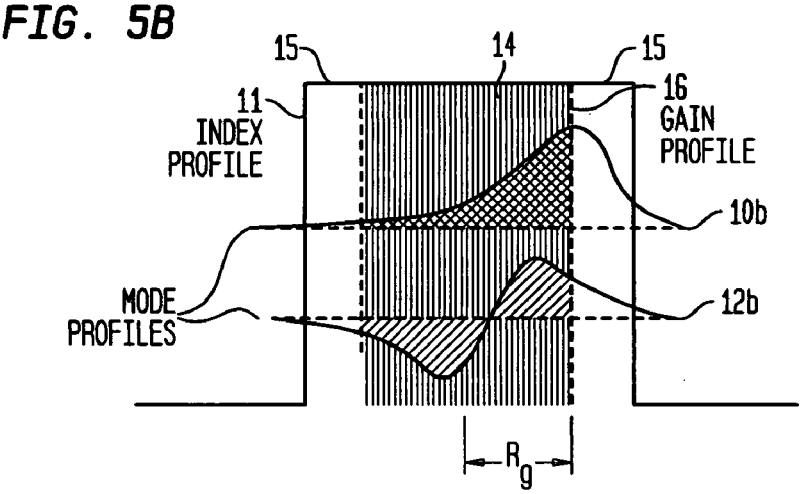

The spatial positions and shapes of signal modes within the index profiles of the core region are depicted in FIG. 5A (straight SIF) and FIG. 5B (bent SIF). Here, the fundamental mode 10a and first order mode 12a, which are centrally located in the straight SIF (FIG. 5A), both shift toward the right hand boundary (distorted fundamental mode 10b and first order mode 12b) in the bent SIF (FIG. 5B). In a gain-producing fiber in which the gain dopant is confined to a central core region 14 (i.e., to gain profile 16, leaving peripheral, annular portions 15 without gain), this shift reduces the gain seen by the desired fundamental mode 10a and/or increases the amount of gain seen by other modes.

In addition, if an LMA fiber is a gain-producing fiber, its relatively large core size allows signal light to propagate in multiple transverse modes (e.g., modes 10b, 12b of FIG. 1B) at the signal wavelength, which creates competition for gain among any modes that overlap the gain profile 16 of the core. In this case, HOMs, such as the first order mode 12b depicted in FIG. 1B, may be suppressed by techniques well-known in the art, as mentioned previously.

These problems are addressed by the bend-resistant LMA fiber designs in accordance with my invention, as discussed infra.

Optical Fibers—Reduced Bend Distortion

The problems associated with bend distortion in LMA fibers are addressed in accordance with one aspect of my invention by a unique fiber design illustrated in FIG. 9. More specifically, the index profile of the core region 91 is graded (FIG. 9A) from a central maximum $n_0$ at or near the axis 93 to a lower level $n_g$ at or near the outer boundary of the core region 91 (i.e., at or near $R_{core}$). The grading depth is defined as $\Delta n_g = n_{core} - n_{grad}$. When $\Delta n_g \sim \Delta n_c$, the fiber is said to be fully-graded, and when $\Delta n_g \sim 0.5 \Delta n_c$, the fiber is said to half-graded.

Although the standard fabrication process of many silica optical fibers results in a narrow dip in index at the axis 93, such dips are ignored here as not significantly impacting the analysis that follows or the resulting design.

In addition, the particular shape of the graded profile does not appreciably affect the reduction in bend distortion achieved by my invention. Thus, the shape of the graded profile is not critical; it may be linear (e.g., cone-shaped) or curved (e.g., parabolic or non-parabolic).

In accordance with one embodiment of my invention, the grading depth ($\Delta n_g$), the radius of the core region ($R_c$), and the contrast ($\Delta n_c$) of fiber 90 are configured to reduce bend distortion. When the fiber 90 is bent to radius $R_b$, the equivalent index profile, as shown in FIG. 9B, shifts from profile 94 (unbent fiber) to profile 95 (bent fiber), which advantageously has a relatively flat peak portion 96. Bend distortion can be measured in several ways; for example, by the radial displacement of the fundamental mode or by the reduction in effective mode area ($A_{eff}$) of the fundamental mode.

Preferably, $\Delta n_g$, $R_c$ and $\Delta n_c$ are configured so that in the bent fiber the fundamental mode displacement ($x_d$) does not exceed a predetermined multiple (or fraction) of the mode size, for example, $(0.9)(A°_{eff}/\pi)^{0.5}$, or the mode area ($A_{eff}$) is not reduced by more than a predetermined fraction, for example, 50% (i.e., $A_{eff}/A°_{eff}$>0.5). Advantageously, $\Delta n_g$, $R_c$ and $\Delta n_c$ are also configured to maximize $A_{eff}$, suppress higher order modes (HOMs), reduce bend loss, and enhance gain interaction, as discussed infra.

In accordance with another aspect of my invention, as shown in FIG. 16, a method 160 of fabricating a low-bend-distortion LMA optical fiber comprises the steps of:

(161) For a given application of a bent (e.g., coiled) LMA fiber that requires no more than a predetermined maximum level of bend loss, no more than a predetermined maximum level of bend distortion, and no less than a predetermined minimum level of HOM loss (as specified, for example, by an LMA fiber customer), determine a suitable range of bend radii, $R_b$. For example, a suitable range might be 10 cm<$R_b$<15 cm. Typically, bend loss and HOM loss requirements are specified by the fiber customer. Bend distortion limitations may not be explicit requirements but may be implicitly required in order to satisfy other requirements such as beam quality, gain efficiency, as discussed infra.

(162) Choose the largest $R_b$ allowed by the particular application of Step 161. In the illustrations below, I have assumed that the largest $R_b$=15 cm for purposes of exposition only.

(163) Choose a particular graded index-profile for the core region. Suitable graded profiles include, for example, those in which the index is quadratically dependent on radius (e.g., parabolic and step-parabolic profiles) and those in which the index is linearly dependent on radius (e.g., cone-shaped profiles).

(164) Choose $\Delta n_c$ to produce no less than a predetermined minimum level of HOM loss; e.g, to suppress particular HOMs (or all HOMs) with the lowest margin. Let us assume that that the desired minimum HOM loss for the particular application of Step 161 is at least 1 dB/m at 1060 nm. Then, FIG. 18 indicates that $\Delta n_c$ should be about 0.00065 (data point 18.4) if, for example, $D_{core}=D_c$32 2$R_c$=75 μm and $\Delta n_g/\Delta n_c$=0.5 (so that $\Delta n_g$=0.5×0.00065=0.00033). Similarly, $\Delta n_c$ should be about 0.00071 (data point 18.5) if, for example, $D_{core}=D_c$=2$R_c$=90 μm and $\Delta n_g/\Delta n_c$=1.0 (so that $\Delta n_g$=1.0× 0.00071=0.00071). We note here that suppression of a HOM does not necessarily imply complete suppression; that is, the intensity/power of a particular HOM being suppressed may be reduced to a sufficiently low level that its presence may be insignificant in the operation of the product associated with the application of Step 161.

(165) Choose $\Delta n_g$ to produce no more than a predetermined maximum level of bend loss and no more than a predetermined maximum level of bend distortion; e.g. to minimize bend loss and bend distortion at $R_b$. One parameter that is an appropriate measure of bend distortion is the change (decrease) in effective mode area as a fiber is bent. The effective area of a bent fiber ($A_{eff}$), normalized to the effective area of a straight fiber ($A°_{eff}$) is plotted in FIG. 19A vs. the grading depth ($\Delta n_g$) normalized to the contrast ($\Delta n_c$). Let us assume that the particular application allows no more than about 50% reduction in effective area when the fiber is bent to $R_b$=15 cm; that is, $A_{eff}/A°_{eff} \geq 0.5$, as indicated by threshold 19.0a. From curve 19.4a for $D_c$=75 μm we find that $\Delta n_g/\Delta n_c$=0.5 yields $A_{eff}/A°_{eff}$~0.86 (data point 19.6a), which satisfies the above criterion. The 90-μm fully-graded fiber (curve 19.5*a*) has $A_{eff}/A°_{eff}$~0.99 (data point 19.7*a*), and also satisfies the criterion.

Figure 19A:
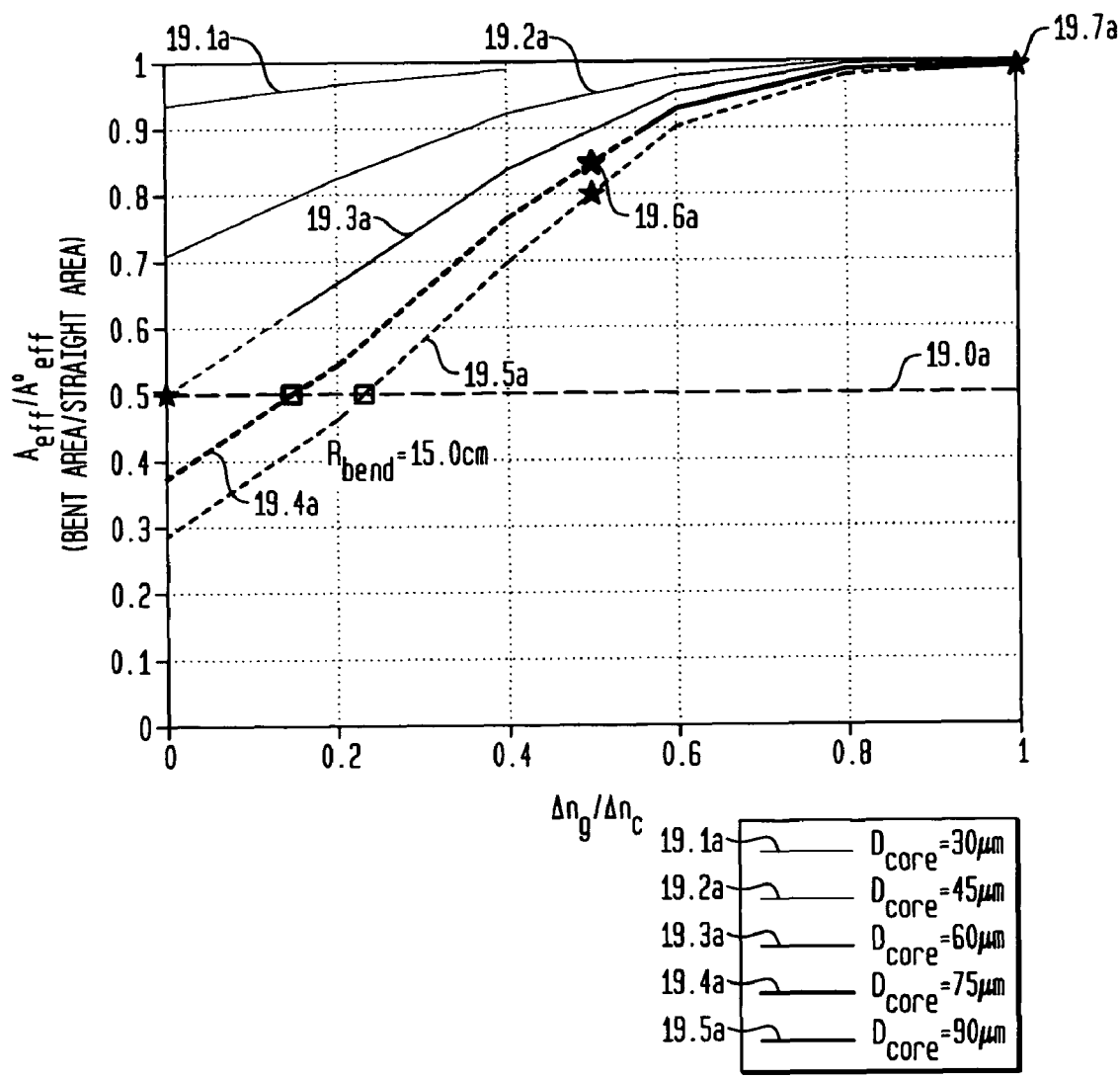
FIG. 19A is a graph of simulated $A_{\it eff}$ under bent conditions (normalized to $A°_{\it eff}$, the effective mode area of a straight fiber) vs. $\Delta n_g/\Delta n_c$ for different core diameters. The ratio $A_{\it eff}/A°_{\it eff}$ is a measure of bend distortion; it is close to one for an undistorted mode (e.g., in a straight fiber) and typically much less than one for severely distorted modes (e.g., in a fiber bent to a small radius). Increasing the grading fraction ($\Delta n_g/\Delta n_c$) reduces the amount of distortion, shown here as $A_{\it eff}/A°_{\it eff}$ approaching unity for each of the core diameters. The level of distortion is much greater overall for fibers with larger core diameters. For each fiber in this comparison, An, was chosen to satisfy an HOM suppression requirement of 1 dB/m. Line 19.0a indicates an illustrative $A_{\it eff}/A°_{\it eff}$ threshold of 0.5.
Figure 19B:
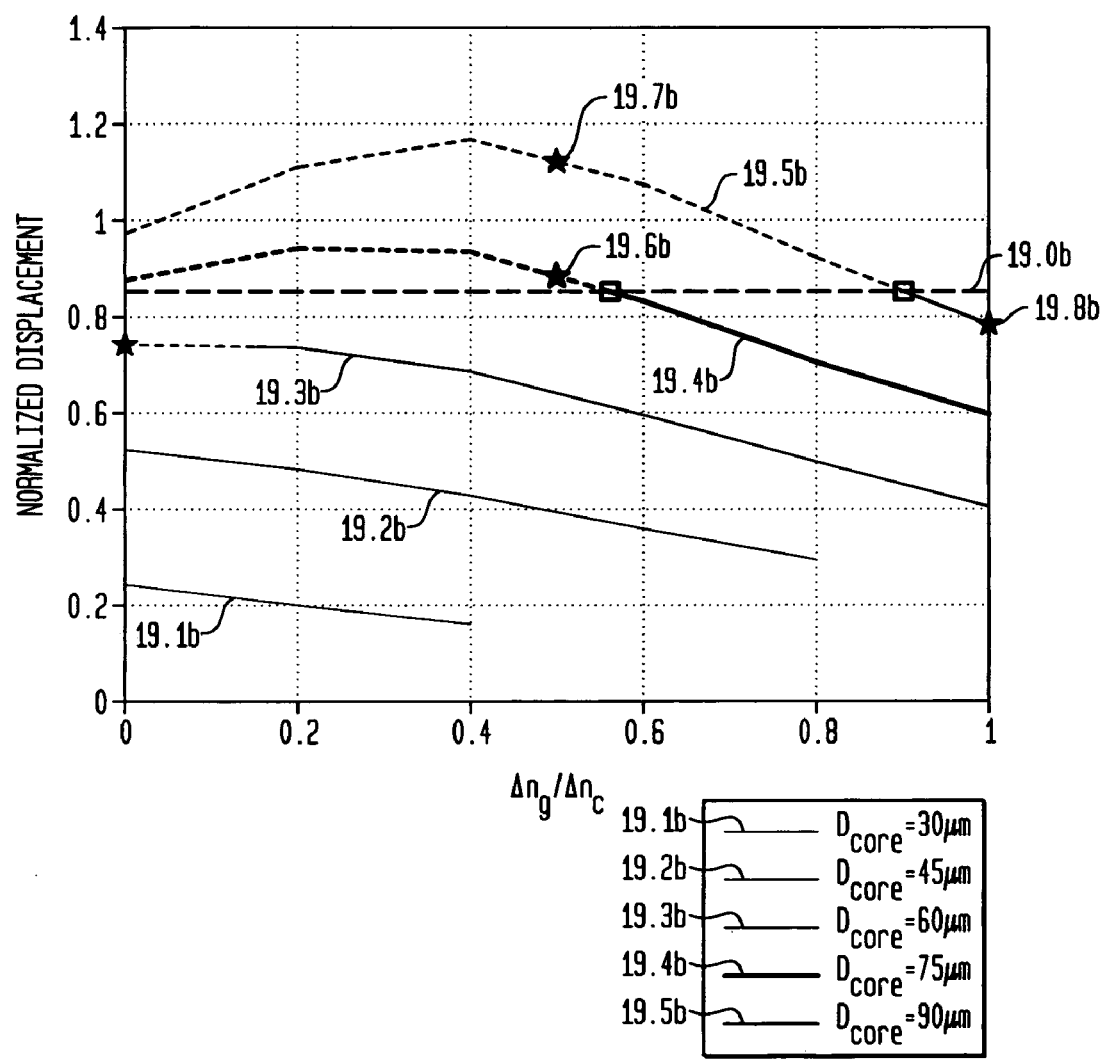
FIG. 19B is a graph of simulated, normalized (to the mode radius) mode displacement vs. $\Delta n_g/\Delta n_c$. Line 19.0b indicates an illustrative displacement threshold of 0.85.

Another measure of bend distortion is the mode displacement of a bent fiber ($x_d$) normalized to the mode radius [$R_{mode}=(A°_{eff}/\pi)^{0.5}$], which is plotted in FIG. 19B vs. the grading depth ($\Delta n_g$) normalized to the contrast ($\Delta n_c$). The plot also shows a horizontal dashed line 19.0*b* indicating a displacement threshold $x_d/R_{mode}$ <0.85. In this plot, we see that the 75-μm-half-graded fiber (curve 19.4*b*; data point 19.6*b*) has $x_d/R_{mode}$~0.9 and fails to meet the requirement. Likewise, the 90-μm half-graded fiber (curve 19.5*b*; data point 19.7*b*) has $x_d/R_{mode}$~1.1 and also fails to meet the requirement. On the other hand, the 90-μm-fully-graded fiber (curve 19.5*b*; data point 19.8*b*) has $x_d/R_{mode}$~0.8 and satisfies the requirement.

In the same fashion bend loss is analyzed. FIG. 20 shows that a 75-μm half-graded fiber (curve 20.4; data point 20.6) has a bend loss of ~0.18 dB/m, and a 90-μm fully-graded fiber (curve 20.5; data point 20.7) has a bend loss of ~0.07 dB/m. Therefore, both of these fibers satisfy the requirement of bend loss<0.2 dB/meter. In contrast, a 90-μm half-graded fiber (curve 20.5; data point 20.8) has a bend loss of 0.3 dB/m and does not satisfy the requirement.

Figure 21:
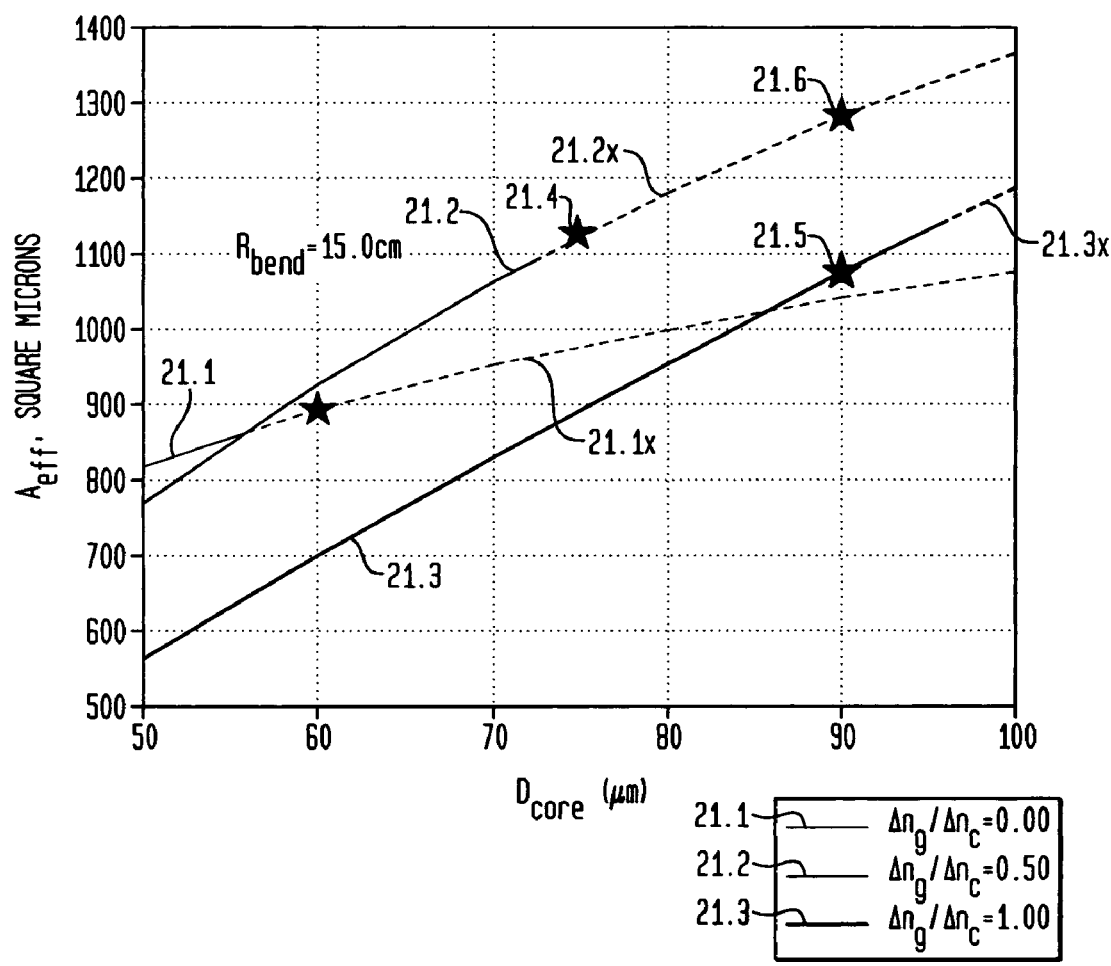
FIG. 21 is a graph of simulated $A_{\it eff}$ under bent conditions vs. $D_c=2R_c$ for different values of $\Delta n_g/\Delta n_c$.

(166) Choose $R_c$ to produce no less than a predetermined minimum level of $A_{eff}$ subject to Steps 162-165; e.g., to maximize $A_{eff}$. FIG. 21 depicts how $A_{eff}$ varies with the core diameter $D_c$. for numerous fibers with three values of the normalized grading depth: SIFs that are not graded ($\Delta n_g/\Delta n_c$=0.00; curve 21.1), half-graded fibers ($\Delta n_g/\Delta n_c$=0.50; curve 21.2), and fully-graded fibers ($\Delta n_g/\Delta n_c$=1.00; curve 21.3). Importantly, curves 21.1, 21.2, and 21.3 of the SIF, half-graded fibers, and fully-graded fibers respectively, have, according to my analysis, forbidden zones 21.1*x*, 21.2*x*, and 21.3*x*, respectively, which define ranges of $D_c$ that are unsuitable because they produce too much bend loss and/or too much bend distortion. Thus, FIG. 21 shows that for the SIF (curve 21.1) $D_c$>55 μm are unsuitable, for the half-graded fiber (curve 21.2) $D_c$>73 μm are unsuitable, and for the fully-graded fiber (curve 21.3) $D_c$>95 μm are unsuitable. FIG. 21 also shows that a 75-μm half-graded design (curve 21.2) achieves a relatively large mode area (>1100 μm²; data point 21.4), which is larger than the area of the 90-μm fully-graded design (curve 21.3; data point 21.5). However, from Step 165 we determined that the 75-μm half-graded design was unacceptable because its mode displacement was too high, whereas the 90-μm fully-graded design satisfied the bend loss and both bend distortion requirements (FIGS. 19-20). The 90-μm fully-graded design (curve 21.3; data point 21.5) achieves an area of 1070 μm².

From the forbidden zones of FIG. 21 we can further see that a half-graded fiber (curve 21.2) with $D_c$~71-72 μm would satisfy the requirements of Steps 162-165 and achieve an $A_{eff}$~1100 μm, similar to that the 90-μm fully-graded fiber (curve 21.3; data point 21.5). Alternatively, fully-graded fibers (curve 21.3) with $D_c$~95 μm achieve areas above 1130 μm² and still satisfy the requirements of Steps 162-165. These designs are both desirable and nearly equivalent according to my current analysis. One might be preferred over the other based on other considerations, such as ease of fabrication.

Two other highlighted designs illustrate features of the design procedure. First, half-graded fibers (curve 21.2) with even larger core size ($D_c$=90 μm) achieve even larger mode areas (~1280 μm²; data point 21.6) but they violate both the bend loss and bend distortion requirements. Second, step-index fibers (curve 21.1) perform very poorly, failing requirements even at $D_c$=60 microns and $A_{eff}$<900 μm²; and (167) Provide $\Delta n_g$, $\Delta n_c$, $R_c$, and the graded-index core profile, as determined above, to a fiber manufacturer in order to have the desired LMA fiber fabricated.

In accordance with a preferred embodiment of my LMA fiber, the core region includes a centralized gain-producing region 14 (FIG. 5A) having a gain profile 16 of radius $R_g<R_c$, and $\Delta n_g$ and $R_g$ are also chosen to meet gain interaction requirements, which set forth quantitatively how the signal light interacts with the gain region. Fundamentally gain efficiency is the important consideration. But, since efficiency depends on the larger system configuration (e.g., pump power, etc.), we rely instead on two other parameters: dark fraction and gain overlap, which are discussed below.

Figure 5C:
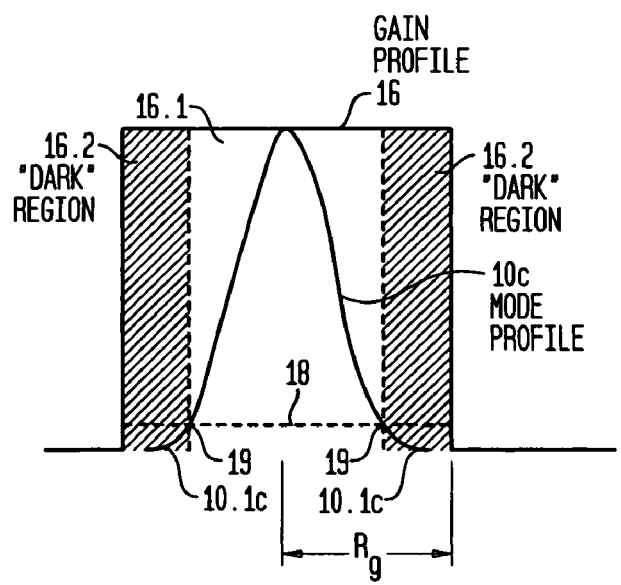

More specifically, to assess gain interaction it is important to recognize that portions of the gain region may see very little signal light intensity. In FIG. 5C, the gain profile 16 is shown to include a centralized, cylindrical illuminated region 16.1 surrounded by a peripheral, annular dark region 16.2. As discussed for more fully infra, the performance of a LMA gain-producing fiber depends on how much of the gain-producing region is significantly illuminated by the signal mode; that is, how large (in area) the illuminated region 16.1 is relative to the dark region 16.2.

As shown in FIG. 5C, the dark region 16.2 is defined as that portion of the gain region where the intensity of the signal mode profile 10*a* is far below its peak; that is, below some predetermined threshold intensity level 18. The most appropriate choice of threshold depends on the amplifier, but illustratively threshold level 18 is ~1% of the peak intensity of the signal mode profile 10*c* is suitable. In the limit of a high-intensity, fast signal pulse and low duty cycle, a suitable threshold can be chosen relative to the saturation fluence or saturation energy, as discussed in detail infra.

Depending on the total signal power, the signal mode may fail to extract energy in the dark region 16.2. Energy not captured by the signal is then available to preferentially amplify noise components in unwanted modes. That is, gain dopants in a dark region will tend to be at higher inversion levels and tend to preferentially amplify modes other than the signal mode.

Previously we illustrated the case where mode displacement does not exceed, for example, $(0.9)(A°_{eff}/\pi)^{0.5}$, or the area reduction may be further required to be less than, for example, 50% (i.e., $A_{eff}/A°_{eff}$>0.5). This requirement excludes designs that exhibit very large bend distortion and/or highly degraded gain interaction. In some cases, moderate bend distortion (and accompanying moderate degradation of gain interaction) may be acceptable. These cases may be managed by well-known techniques including, for example, careful mode-matching at the input, preventing mode-coupling perturbations, managing of pump power, etc. That is, a fiber may have relatively loose standards of bend distortion and gain interaction if the larger system is carefully designed to manage problems associated with such a fiber. On the other hand, it is desirable in some cases to have stricter standards in bend distortion and gain interaction, to make the fiber easier to incorporate in a system or to improve overall performance of the system (efficiency, power, etc.). To further enhance gain interaction, the mode displacement may be further required to be less than, for example, $(0.2)(A°_{eff}/\pi)^{0.5}$, or the area reduction may be further required to be less than, for example, 20% (i.e., $A_{eff}/A°_{eff}$>0.8). The fractional displacement is closely related to the dark fraction and gain overlap that can be achieved. For example, the dark fraction (DF) can be roughly approximated by the following expression:

$$DF \sim 1 - 1/(1+x_d/R_{mode})^2 \qquad \text{(iii)}$$

where the mode radius $R_{mode}$ can be defined in a variety of ways; e.g., as MFD/2, $(A°_{eff}/\pi)^{0.5}$ for a straight fiber, or $(A_{eff}/\pi)^{0.5}$ for a bent fiber. The preferred threshold value for $x_d/R_{mode}$ (e.g., $x_d/R_{mode}<0.9$) can then be related to thresholds for dark fraction. Similarly, reduction in area is indicative of the bend distortion that degrades gain interaction.

In accordance with another preferred embodiment of my invention, the illuminated region 16.1 is preferably at least ~70% of the area of the gain-producing region/profile 16. Stated another way, the area of the dark region 16.2 is preferably less than ~30% of the area of the gain-producing region/profile 16.

In order to measure dark fraction, the straightforward approach would be to simply measure the mode profile 10c (FIG. 5C) and the gain profile 16 and then, for a given threshold 18, determine the amount of signal light that falls below the threshold. An alternative technique would be to utilize the subject fiber in an optical amplifier and then apply pump light to increase the gain, extract energy with signal light, and then extract the residual energy with a probe beam coupled into the higher-order modes of the fiber. The fiber length could be chosen to distinguish various effects (bend loss vs gain). In this approach, the dark fraction would be the fraction of energy available for amplifying the signal wavelength in the fiber gain region that is not efficiently extracted by signal light in the fundamental mode.

Figure 17:
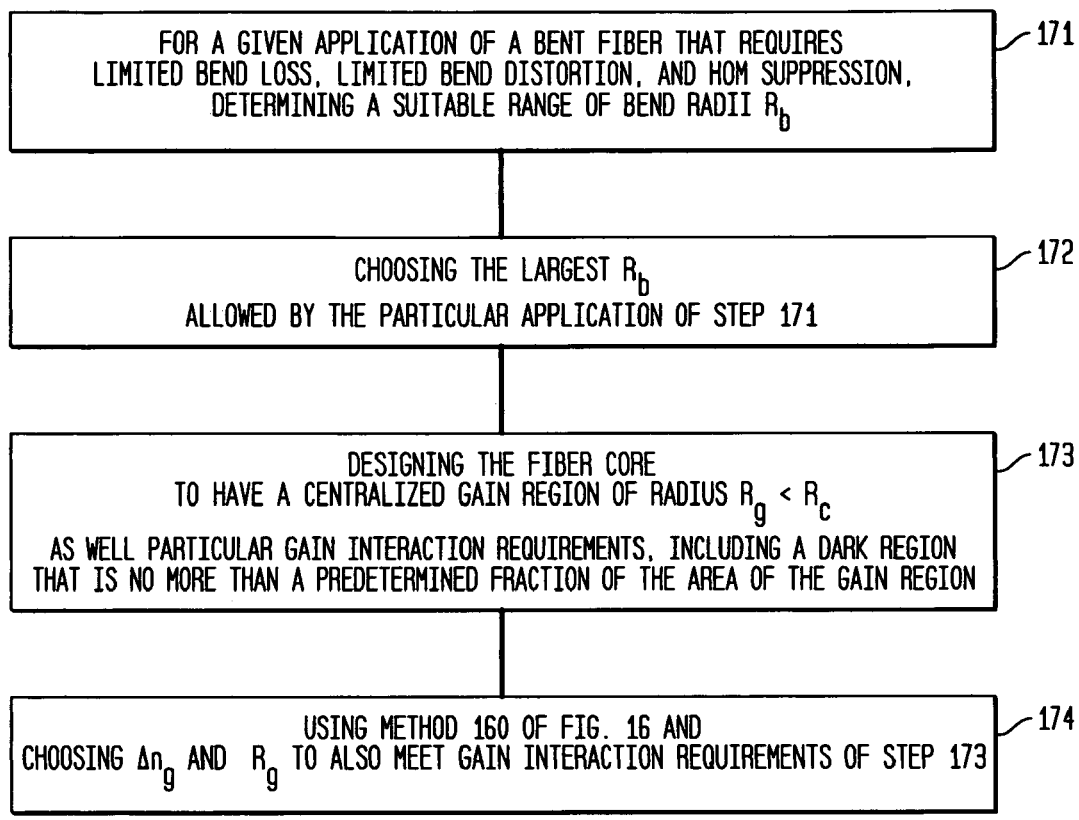
FIG. 17 is a flow chart used in the description of another alternative method of fabricating a low-bend-distortion, gain-producing LMA fiber having a gain region centralized within the core region, in accordance with one more embodiment of my invention.

The corresponding method 170 (FIG. 17) of making such a LMA as a gain-producing fiber includes the steps of:

(171) For a given application of a bent (e.g., coiled) gain-producing LMA fiber that requires no more than a predetermined maximum level of bend loss, no more than a predetermined maximum level of bend distortion, and no less than a predetermined minimum level of HOM loss, determine a suitable range of bend radii, $R_b$.

(172) Choose the largest $R_b$ allowed by the particular application of Step 171;

(173) Design the fiber core region to have a centralized gain region of radius $R_g<R_c$ as well as particular gain interaction requirements; i.e., design the gain region to have a peripheral dark region that is no more than 30% of the area of the gain region; and (174) In method 160, choose $\Delta n_g$ and $R_g$ to meet gain interaction requirements The foregoing discussion of FIGS. 18-21 can be related to the following section "Bend-Distortion Analysis of LMA Fibers." The description of FIGS. 18-21 is essentially a summary of the following detailed description of FIGS. 5-15. More specifically, FIGS. 18-21 start by assuming the step-parabolic profile of FIG. 9 with three degrees of freedom. FIGS. 18-20 summarize the requirements discussed at length below (especially with reference to FIGS. 5, 7, 8 and 11) that the bend loss must be sufficiently low, HOM suppression must be sufficiently high, and the bend distortion must be sufficiently small that it does not degrade gain interaction. The bend loss and HOM suppression requirements discussed, for example in the following comparison of FIGS. 8 and 10, is summarized for the step-parabolic design space in FIGS. 18 and 20. The two best indicators of bend distortion discussed below are area reduction (discussion of FIG. 4) and mode displacement (discussion of FIG. 14). Therefore, these two indicators are used in the design-space summary of FIGS. 19A-19B. Finally, FIG. 21 shows the area that can be achieved subject to these combined requirements, with essentially the same conclusion as that reached below in the discussion of FIG. 15B; i.e., a bent-fiber area of around 1100 $\mu m^2$ can be achieved with good gain interaction in accordance with one embodiment of my invention.

Bend-Distortion Analysis of LMA Fibers

Bend-induced distortion is illustrated by the simulated modefield profiles shown in FIG. 1. The plots show modes of two LMA SIFs: FIGS. 1(a) and 1(b) correspond to a SIF with 32 μm core diameter and contrast $\Delta n_{core}=0.00084$, and FIGS. 1(c) and 1(d) correspond to a SIF with 110 μm core diameter and contrast $\Delta n_{core}=0.00056$. For each, the mode of a bent-fiber [FIG. 1(b), $R_b$=9 cm; and FIG. 1(d), $R_b$=15 cm] is compared with that of a straight fiber [FIGS. 1(a) & 1(c)]. The smaller 32 μm core SIF shows mild bend distortion at a 9 cm bend radius, whereas the larger 110 μm core SIF shows very severe distortion despite being bent to a gentler, 15 cm bend radius. With these contrasts and bend radii, the two fibers have comparable bend loss. All calculations use the well-known finite-difference method.

In the following discussion reference is made to coiled fiber, which is a common configuration used to package fiber within a small area (e.g., within the package of a fiber optic amplifier or fiber optic laser). However, those skilled in the art will recognize that the bend distortion principles apply equally as well to other products in which at least a segment of a fiber is spooled, bent, or otherwise curved.

The images of FIG. 1 point out the importance of calculating and measuring fiber properties at a bend radius relevant to the actual operating conditions of the particular application (e.g., a fiber optic amplifier). The calculated $A_{eff}$ of the straight fiber is over 5000 $\mu m^2$ (at 1060 nm), but this area is not consistent with coiled fiber packaging or with the common practice of stripping HOMs by bending the fiber. If the fiber is intended for use on a 15 cm radius spool, then $A_{eff}$ of ~1100 $\mu m^2$ (FIG. 2, curve 20, at $R_b$=15 cm) of the bent fiber will determine the nonlinearities over most of the fiber length. FIG. 2 shows that, for reasonable spool sizes (i.e., bend radii), the 110 μm SIF has $A_{eff}$ only about twice that of the 32 μm SIF despite having 13 times greater core area. At the same time, difficulties in fabricating and using conventional SIF fibers increase dramatically as core diameter exceeds ~30-50 μm. (However, LMA fibers with core diameters around 100 μm have been fabricated successfully.) The choice of fiber core size should be based on a careful estimate of the nonlinear performance in actual operation, balanced by difficulties such as managing unwanted HOMs.

Figure 3A:
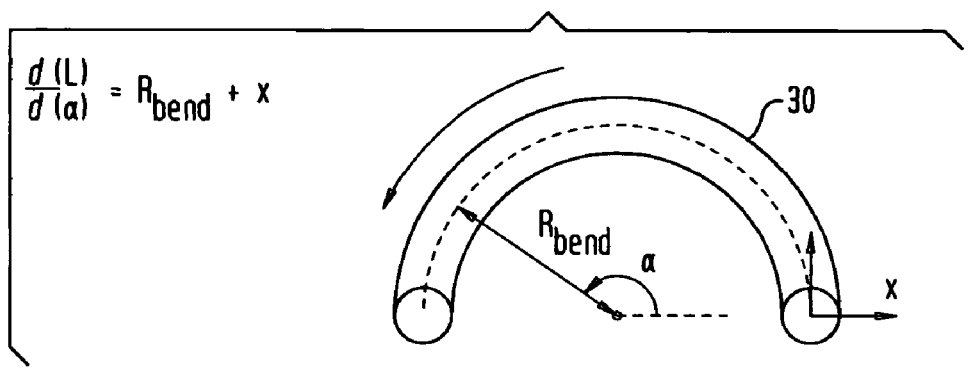
FIG. 3 is a conformal mapping model of macro-bending of a bent optical fiber, as shown in FIG. 3A.
FIG. 3B is a graph of the step-index profile of an axial cross section of the core region for a straight fiber (not shown)
FIG. 3C is a graph of the equivalent core region index for the bent fiber of FIG. 3A.
Figure 3B:
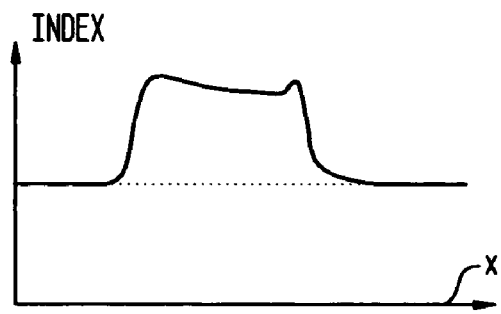
Figure 3C:
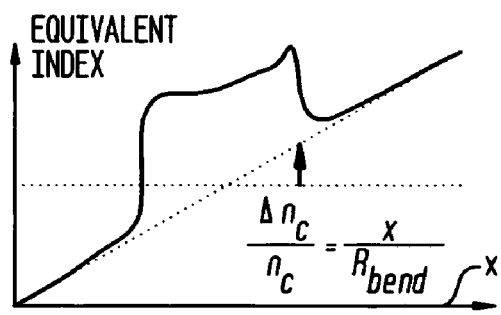

Reduction of $A_{eff}$ is just one example of how even the gentle bending of a coiled fiber does much more than induce optical loss. For LMA fibers, the standard conformal mapping model (FIG. 3) describes a bend as a change in the index profile of the fiber. In this model an equivalent index profile (FIG. 3C) of the bent fiber 30 incorporates geometrical path-length differences together with the material index profile; that is, the geometrical path length around the bend (i.e., the circumferential path length L at any azimuthal angle α; FIG. 3A) depends on the position x in the fiber cross section. The bend perturbation is an index gradient $n_c/R_b$ ($n_{core}=n_c$; $R_{bend}=R_b$) toward the outside of the bend. The modified index profile will generally change all of the bent fiber's mode properties, although some changes may be small or unimportant. In addition to loss and mode size, in a gain-producing fiber it is also important whether light sees the gain dopants, and the following sections show that bending a gain-producing LMA fiber has a large effect on gain interaction.

Figure 4A:
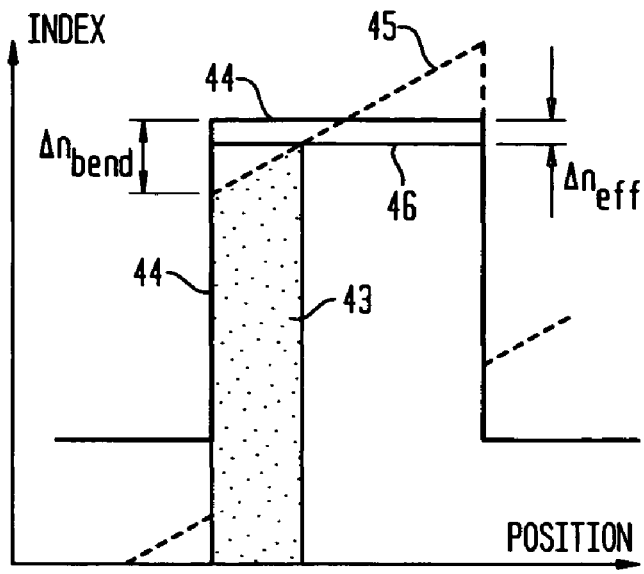
FIG. 4 shows a simple schematic of the index profiles of a SIF (FIG. 4A) used to describe the onset of large bend distortion and shows distortion curves (FIG. 4B) for well-confined SIFs.

The SIFs simulated in the FIG. 1 suggest that distortion sensitivity becomes worse as the mode area increases. The intuitive picture of FIG. 4 captures the basic mechanism of distortion and provides an understanding of how bend sensitivity depends on core size and contrast. FIG. 4A shows a material index profile 44 of a straight SIF and the equivalent index profile 45 of the bent SIF. The signal mode effective index 46 and fiber index profiles 44, 45 define a forbidden region 43 (stippled) of the core. Distortion curves (FIG. 4B) for well-confined SIFs reduce to a single universal curve when rescaled using the intuitive sensitivity parameter. The curves 20, 22 of FIG. 2 have been repeated in the rescaled axes of FIG. 4B (star data points 40 and circle data points 42, respectively) along with several other SIF simulations (dot data points 41) with a variety of core sizes and contrasts.

The model indicates that the degree of distortion depends on two quantities: the bend perturbation, $$\Delta n_{bend} = n_{core} R_{core} / R_{bend}, \quad (1)$$

and the effective index difference, $$\Delta n_{eff} = n_{core} - n_{eff} \quad (2)$$

When the perturbation is greater than the effective index difference ($\Delta n_{bend} > \Delta n_{eff}$), a portion (region 43) of the core of the bent fiber actually has an index below the signal mode index 46: $n_{eq} < n_{eff}$, where the equivalent index $n_{eq}$ is given by $n_{eq} = n_{material}(1+x/R_b)$. At this point (if not before), the mode will become significantly distorted, since it will be pushed out of this evanescent portion of the core.

This simple model suggests that the total amount of distortion can be estimated by the ratio, $$|\Delta n_{bend}|/|\Delta n_{eff}| = S/R_{bend}, \quad (3)$$

where S is the distortion sensitivity parameter (with units of $R_{bend}$):

$$S \equiv n_{core} R_{core} / n_{eff} \quad (4)$$

Figure 4B:
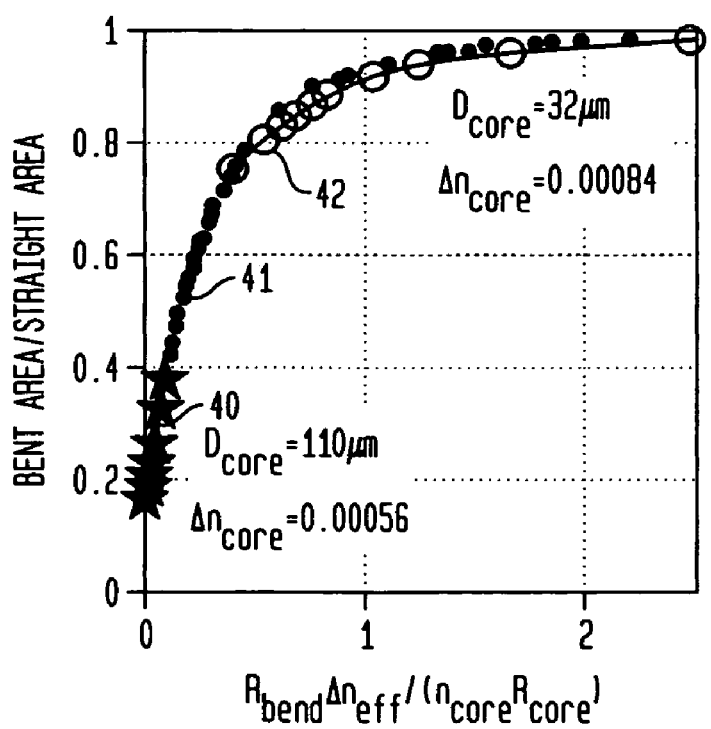

This simplistic sensitivity estimate is easily calculated and provides a surprisingly good description of distortion sensitivity in some fibers. Using this single parameter, I have found that the relative reduction of $A_{eff}$ for a large family of SIFs follows a single relationship, as illustrated in FIG. 4B. Given the relationship between effective index difference and core size for SIFs, the scaling of allowable bend radius (before large bend distortion occurs) is given by $$R_{bend} > S, \text{ which is proportional to } R^3_{core} \quad (5)$$

That is, the cubic relationship implies that bend distortion rapidly becomes significant as core size increases. Using a spool size larger than S will naturally decrease distortion, but large core sizes require bend radii that are not consistent with realistic coiled-fiber packaging. It is important to keep in mind that bent fibers are plagued not only by bend distortion, but also by mode coupling and other impairments that might be overcome by carefully handling the fiber or adjusting fiber contrast. That is, if a very careful, adiabatic transition to a bend is made, and microbending is avoided, it is possible to eliminate mode coupling and associated impairments (bend loss and multi-path interference). To reduce unwanted bend losses, the fiber contrast $\Delta n_{core}$ can be adjusted. However, nonlinearities are still determined by the distorted mode over the length of the coiled fiber, even assuming that the mode fully recovers to its undistorted shape at the output. Similarly, adjusting contrast seems to have little effect on bend distortion, except in the problematic regime of weakly guided fibers. Naturally, bend distortion can be avoided entirely in cases where it is practical to hold the fiber straight. (This approach has been implemented with microstructure fibers, where HOM loss is provided by leakage (tunneling) through the microstructured region, rather than by bending.) For aggressive LMA designs where coiling or spooling is necessary, bend distortion can be reduced if the largest possible spool radius is used.

Modeling Gain in Few-Moded LMA Fibers

Fiber design impacts amplifier performance through the gain coefficients of the various modes as well as the mode losses, areas, etc. To understand the impact of bend distortion on amplifier design, consider how the displaced/distorted mode profile interacts with the gain region. To do so, I introduce a metric of energy extraction along with the usual gain overlaps and show how this parameter highlights an additional difficulty of using extremely large mode areas.

Quantitative predictions of amplifier gain, efficiency, and impairments require a full model including the coupled optical and atomic states. The atomic populations determine the local gain coefficient at each point z along the fiber length. For example, in a standard erbium model, a mode k with normalized intensity $i_k = I_k / \int I_k dA$ sees gain (per unit length) coefficient, $$g_k(z) = \sigma_{ek} \int n_2(r,\theta,z) i_k(r,\theta,z) dA, \quad (6)$$

determined by the excited-state population $n_2$. Light, in turn, modifies the atomic inversion level at each point in the fiber cross section, changing the balance between the excited-state $n_2(r,\theta,z)$ and other atomic state populations; for example, $$d/dt n_2(r,\theta,z) = -n_2 \tau + \Sigma (I_k / h\nu_k)(\sigma_{ak} n_1 - \sigma_{ek} n_2), \quad (7)$$

where the summation is taken over all values of k. Various well known coupled models, which have been studied in detail in the prior art, can be used to understand different regimes of amplifier and laser operation. Systems are limited by different impairments, and there is no single mode parameter that should be optimized for all gain-producing fibers. Having said this, it is useful to have a general LMA design strategy based on mode properties alone, before getting into the details of each application. A few simple parameters calculated from mode solutions can help to quantify the impact of bend distortion on mode competition and identify more promising fiber designs. An obvious place to start is to calculate gain overlaps of the various modes, with the usual approximation that the gain profile [$\sigma_e n_2(r,\theta,z)$], is a constant $g_0$ within radius $R_{gain} = R_g$, and zero outside. This approximation is simplistic, assuming not only that the gain dopant profile is a uniform step but also that the net effect of signal and pump is to produce a uniform inversion level across the gain region of the core. On the other hand, the advantage is that the calculation is then extremely simple and intuitive: a mode has gain in proportion to the fraction k of its power in the gain region, $$g_k = g_0 [\int_{r<R_g} I_k dA] / [\int I_k dA] = g_0 \Gamma_k, \quad (8)$$

where g is gain, I is mode intensity, $\Gamma$ is overlap, dA is differential area, and the second integral is taken over the entire fiber cross-section. Overlap parameters $\Gamma_k$ have been used extensively to guide amplifier fiber design; most directly, gain is proportional to overlap (at fixed $g_0$), and so large overlap can indicate a high-gain design suitable for short-fiber amplification. However, large overlaps do not always indicate a good amplifier. In fact, gain dopants may be intentionally located to give reduced overlap with a signal mode, and the ratio $A_{doped}/\Gamma_k$ of the doped area $A_{doped}$ to the overlap can more directly relate to extractable energy [e.g., J. Nilsson, et al., *Opt. Lett.* Vol. 22, pp. 1092-1094 (1997) and J. J. Plant, et al., *Opt. Lett.*, Vol. 31, pp. 223-225 (Jan. 15, 2006), both of which are incorporated herein by reference]. Gain overlap will be quantitatively considered in the description of FIGS. 14-15 infra.

Gain overlaps also provide a useful estimate of the differential gain between different modes, such as the fundamental mode 10a and the HOM 12a shown in FIG. 5A. A good fiber design might have the fundamental mode 10c (FIG. 5C) better confined to the gain region 16 than the HOMs, providing some HOM suppression. This confinement may be important as fiber designs employ larger mode area, where differential losses become marginal. These estimates of differential gain will generally be optimistic, however, since they ignore the systematic reduction of inversion level at the signal mode peak by the signal itself.

In accordance with yet another preferred embodiment of my invention, the gain overlap $\Gamma$ is greater than a predetermined value (e.g., 60%) and preferably greater than 80%.

Differential gain/loss determines whether few-moded fibers (e.g., those that support at least 2 but fewer than about 20 transverse modes) can be made to be single-moded by the application of known techniques mentioned earlier to suppress HOMs while propagating the fundamental mode.

Before discussing further the relationship between mode profiles and gain profiles, certain aspects of FIG. 5 need to be understood. First, FIG. 5A illustrates a gain profile 16, which defines the region of the core that contains gain dopants in a gain-producing fiber. The gain and core regions could be coextensive (not shown; $R_g = R_c$), which would mean that gain dopants are distributed throughout the entire core region; or the two could be non-coextensive, which would typically mean that the gain region is smaller than the core region (i.e., FIG. 5A; $R_g < R_c$). Second, FIG. 5C illustrates dark regions 16.2; that is, regions that have gain dopants but in which no light (or only very low intensity light) propagates. (Note, the dark regions 16.2 of FIG. 5C do not correspond to the peripheral no-gain-dopant regions 15 of FIGS. 5A & 5B. However, the gain profile 16 of FIG. 5C does correspond to the gain profile 16 of FIGS. 5A & 5B.)

In general, I have found that there are two complementary measures of whether a mode intensity profile and gain profile match one another. Briefly, if there is signal light (e.g., the tails of the fundamental mode 10a, FIG. 5A) outside of the gain region 16, the gain overlap is disadvantageously reduced. On the other hand, if there is gain in a region that has little or no light (e.g., in the dark regions 16.2 of FIG. 5C), then the gain does not interact sufficiently with the signal mode; that is, in an amplifier, pump energy is absorbed in the regions, but the energy does efficiently amplify the signal and may instead amplify noise (for example, amplified spontaneous emission, or ASE).

More specifically, the mode profile-to-gain profile overlap ($\Gamma$) determines how much of the mode lies within the gain region, whereas the complementary dark fraction indicator determines how much of the gain region is significantly illuminated by the signal mode.

Peripheral "dark" regions 16.2 (FIG. 5C) of the core, where the signal is weak, degrade amplifier efficiency, which is consistent with the signal-power-dependent amplifier efficiency observed by J. M. Oh, et al., *Conference on Lasers and Electro-optics* (Optical Society of America, May, 2006), paper CTuQ3, which is incorporated herein by reference. Depending on the total signal power, the signal mode may fail to extract energy from gain dopants in the peripheral regions where the signal intensity is far below its peak (e.g., in the fundamental mode tails 10.1c, FIG. 5C). Energy not captured by the signal is then available to preferentially amplify noise components in unwanted modes. That is, gain dopants in a dark region will tend to be at higher inversion levels and tend to preferentially amplify modes other than the signal mode. The dark fraction [DF; Eq. (iii)] is defined as the fraction of the gain region 16 (FIG. 5C) where the signal light intensity lies below a predetermined threshold intensity 18. The most appropriate choice of threshold depends on the amplifier, and in the discussion below I somewhat arbitrarily use a threshold of 1% of the peak intensity. In the limit of a high-intensity ($I_s$), fast signal pulse and low duty cycle, a suitable threshold can be chosen relative to the saturation fluence $U_{sat} = h\nu_k/(\sigma_{as} + \sigma_{es})$ or saturation energy $E_{sat} = U_{sat} A_{doped}/\Gamma_s$ [e.g., Nilsson (1997), supra]. A simplified rate equation [see, Eq. (7)], $$dn_2/dt \approx -I_s n_2 (\sigma_{as} + \sigma_{es})/h\nu_k, \qquad (9)$$

can determine the intensity $I_s^*$ needed to decrease $n_2$ by approximately a factor 1/e in a time designated as $\tau_{pulse}$, $$I_s^* \tau_{pulse} = h\nu_k/(\sigma_{as} + \sigma_{es}) = U_{sat}. \qquad (10)$$

Defining the signal area as the ratio of power to peak intensity, $A_s = P_s/I_{s,peak}$, we have $$I_s^*/I_{s,peak} = U_{sat} A_s/P_s \tau_{pulse}, \qquad (11)$$

or in terms of pulse energy $P_s \tau_{pulse} = E_s$, $$I_s^*/I_{s,peak} = (E_{sat}/E_s)(\Gamma_s A_s/A_{doped}). \qquad (12)$$

In recent LMA, high-energy pulse results the signal energies achieved have been only a few times the saturation energy [e.g., M. Y. Cheng, et al., *Opt. Lett.* Vol. 30, pp. 358-360 (2005), which is incorporated herein by reference], and this ratio is generally limited to ~10 [Renaud et al., JQE (2001), supra]. The threshold $I_s^*/I_{s,peak} = 0.01$ used here may then underestimate the amount of gain region that is effectively dark in typical, non-graded-core amplifiers. A typical range might be roughly $I_s^*/I_{s,peak} \sim 0.02$-$0.2$.

Gain overlap and dark fraction are complementary in the sense that low gain overlap indicates when the mode is too large for the gain region, and high dark fraction indicates when the gain region is too large for the core. Also, the dark fraction addresses, at least in a coarsely approximate way, the spatially resolved depletion of the gain by the signal, which is completely ignored in the overlap calculation. Taken together, they can better explain gain efficiency trends observed at different power levels [Oh et al., CLEO (2006), supra].

Figure 6A:
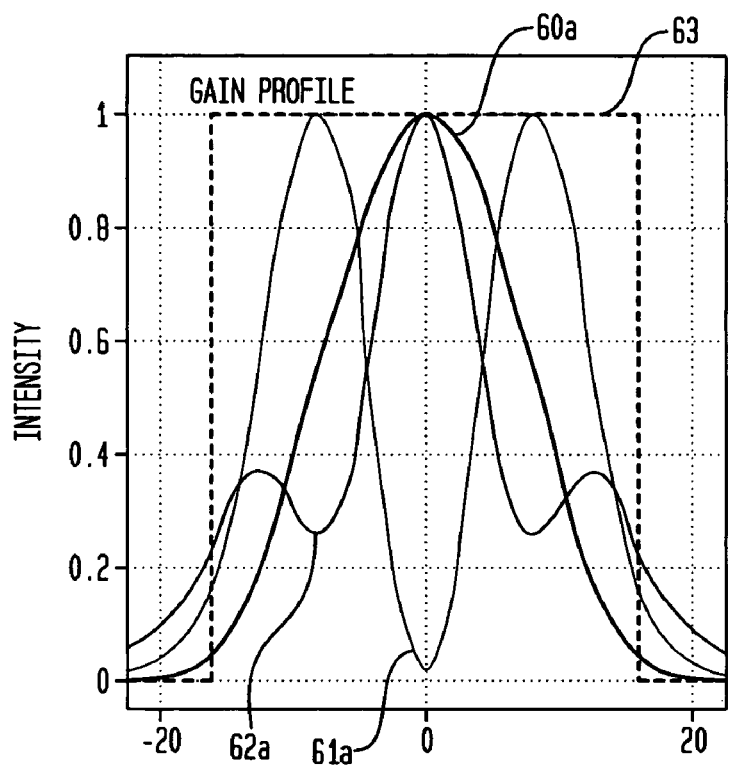
FIG. 6 shows mode intensity spatial profiles within the gain profile of the 32 μm SIF design of FIG. 1. The dark fraction is very low for a straight SIF (FIG. 6A) but increases as bend distortion ($R_b$=9 cm) excludes the fundamental mode from part of the core. Threshold 18 is not shown since it is not visible on the scale of FIG. 6.
Figure 6B:
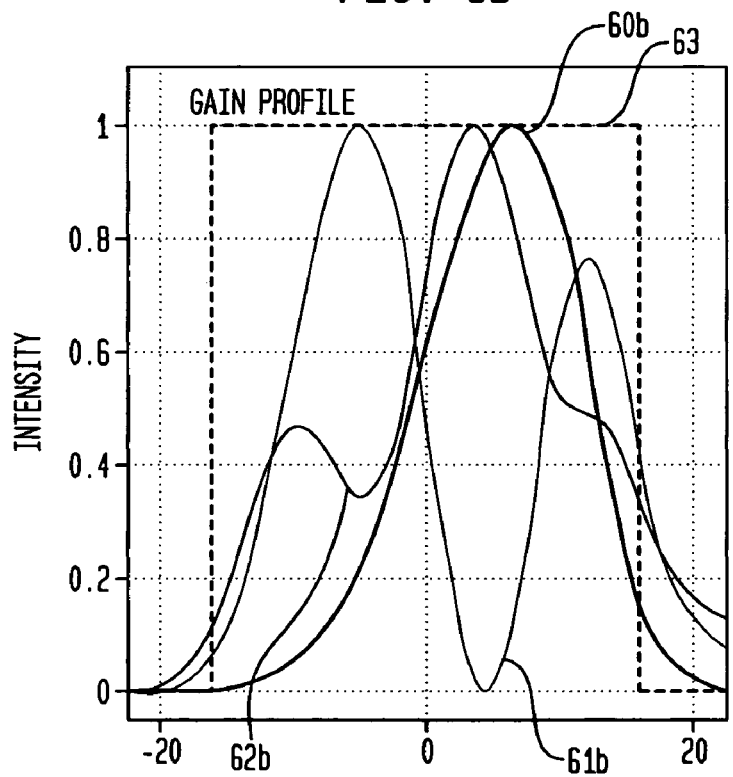

The gain-interaction metrics are illustrated with a specific example in FIG. 6, which shows the mode intensities for the 32 μm SIF of FIGS. 1(*a*) and 1(*c*). Here, I assume the simplest case that the gain profile 63 is a step function coextensive with the core; i.e., with radius $R_{gain} = R_{core}$ in these plots, intensity has already been integrated along the y-direction to give one-dimensional curves for the fundamental mode (bold curves 60a, 60b) and two HOMs (solid curves 61a, 61b, 62a, 62b), shown along with the gain profile (dashed lines 63). These profiles can be further integrated along the x-direction to obtain gain-interaction parameters as in FIG. 5. Even without detailed calculations, it is clear that the gain overlaps are close to unity for all modes, for both straight and bent fibers (only small tails extend out of the gain region). Gain overlaps are more interesting once the more general case $R_{gain} \neq R_{core}$ is considered, as discussed infra. Since most of the gain region sees a reasonable fraction of peak intensity, we can also see that dark fraction is very low for a straight SIF (FIG. 6A) but increases as bend distortion excludes the fundamental mode from part of the core (FIG. 6B, $R_b = 9$ cm). Calculations show that for the straight SIF, with a 1% intensity threshold, the dark fraction is essentially zero.

Figure 1A:
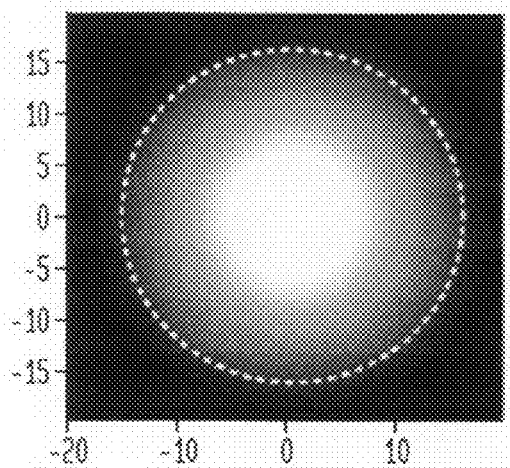
FIG. 1 shows calculated mode intensity images demonstrating the effect of bend-induced distortion on four different step-index fibers (SIFs): (a) a 32-μm-diameter-core SIF with no bend and with (b) a 9 cm radius bend; (c) a 110-μm-diameter-core SIF with no bend and with (d) a 15 cm radius bend. Core boundaries are shown as dashed circles.
Figure 1B:
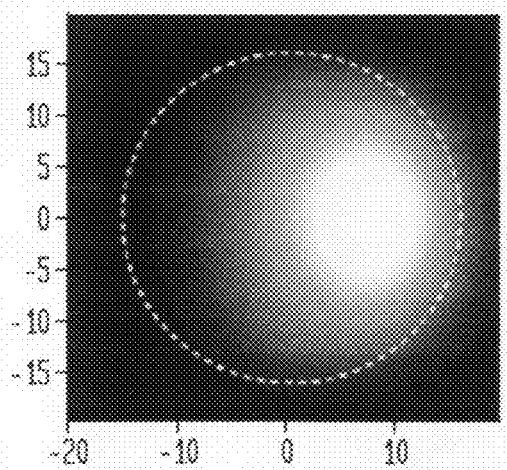
Figure 1C:
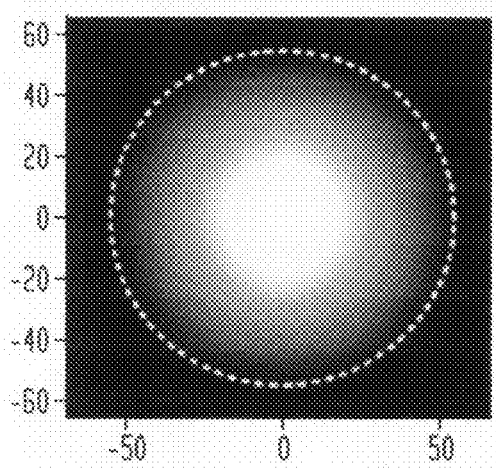
Figure 1D:
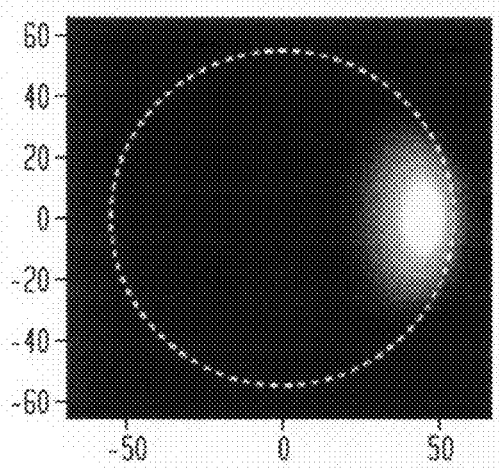
Figure 7A:
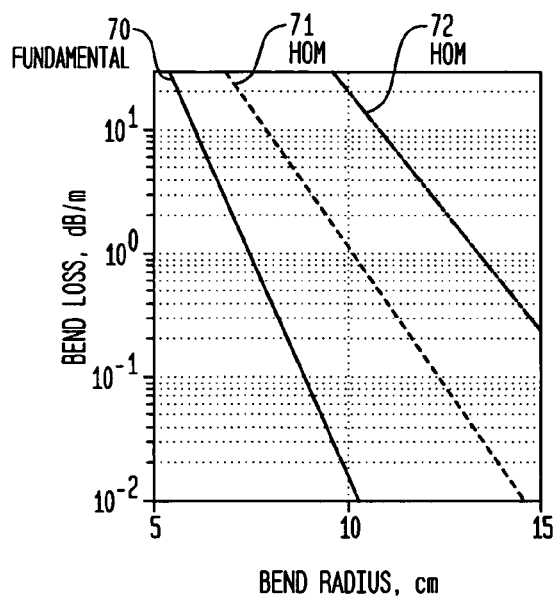
FIG. 7 shows graphs of calculated bend loss (FIG. 7A) and dark fraction (FIG. 7B), both vs. bend radius for the 32 μm SIF of FIG. 1.
Figure 7B:
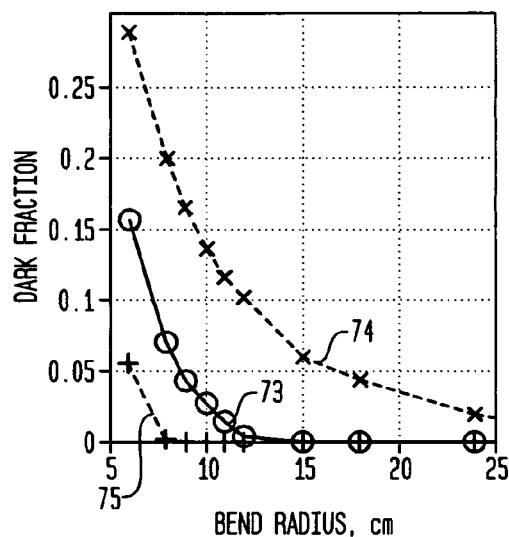

The calculated dark fraction of the 32 μm SIF of FIGS. 1(a) and 1(c) is plotted against bend radius in FIG. 7B, along with the bend loss of the first few modes in FIG. 7A. Bend loss (FIG. 7A) is relatively low for the fundamental mode (curve 70) and much higher for the HOMs (curves 71, 72) for bends with ~9 cm radius, allowing for selective HOM stripping in a fiber spool. The dark fraction (curve 73, FIG. 7B) is very low, indicating good extraction of energy from the gain region. Dashed curves 74, 75 compare alternative dark fraction thresholds (3.3% for curve 74, and 0.3% for curve 75) to the default 1% intensity-peak threshold (curve 73). All three thresholds give low dark fraction for $R_b$~9 cm. These results confirm the fact that mode distortion increases the dark fraction as bends get tighter but also suggest that this is a secondary issue—dark fraction is fairly low even at tight bends ($R_b$=6 cm), where the fiber suffers from unacceptable bend loss. This result echoes that of FIG. 2 (curve 22), where bend distortion was shown to be moderate for this moderately sized core.

The conclusion is that to achieve effective areas in the 500 μm² range, the conventional approach of neglecting bend distortion can be correct. Only the loss is very sensitive to bending (assuming that mode coupling is avoided). Further, while some fine tuning of the fiber bend will be needed to achieve optimal HOM suppression and low fundamental mode loss, there is a relatively comfortable margin between the fundamental mode and HOM losses. These calculations are in agreement with conventional wisdom, that moderate LMA fibers can be achieved with reasonable handling and fabrication tolerances.

Figure 8A:
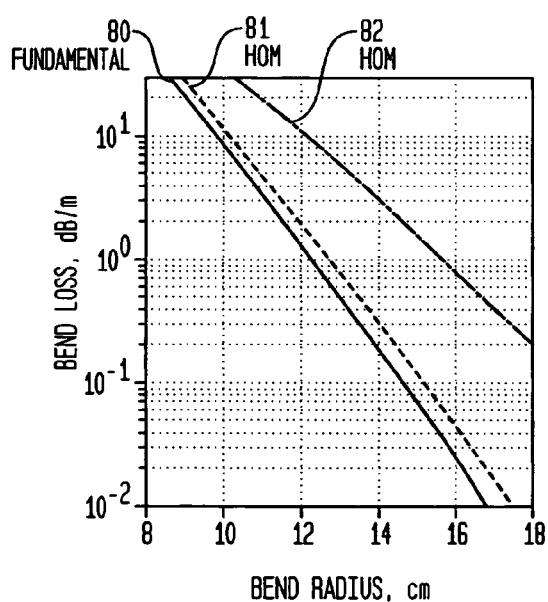
FIG. 8 shows graphs of calculated bend loss (FIG. 8A) and dark fraction (FIG. 8B), both vs. bend radius for the 110 μm SIF of FIG. 1.
Figure 8B:
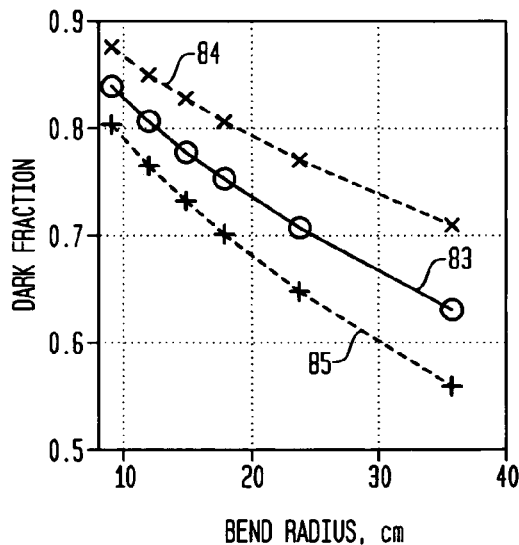

The situation for the 110 μm SIF example is drastically different, as shown in the bend loss and dark fraction graphs of FIG. 8. The bend-loss calculations (FIG. 8A) for this fiber show almost no selectivity between the fundamental mode (solid curve 80) and some of the HOMs (dashed curves 81, 82). The dark fraction (FIG. 8B) is high at essentially all bend radii for all thresholds, consistent with the large distortion visible in the mode images in FIG. 1A(c) and FIG. 1A(d). Details differ for dark thresholds at 3.3% (curve 84), 1.0% (curve 83), and 0.3% (curve 85) of the peak intensity, but the qualitative impact of bend distortion on energy extraction is similar.

Clearly, bend loss and dark fraction for this 110 μm SIF indicate serious problems at all realistic bend radii. In addition, there is very poor loss suppression of HOMs. The first group of HOMs (curve 81) has almost the same bend loss as the fundamental mode (curve 80) for all bend radii, and even the second group of HOMs (curve 82) has low enough loss to play a possible role in gain efficiency or beam quality. Similarly, no significant gain suppression of HOMs is available, since gain overlaps (not shown) for the fundamental and HOMs are all essentially unity. At the same time, the dark fraction is very high, so that the signal will have difficulty extracting energy from most of the gain region. The large fraction of dark region gain will become highly inverted, providing gain to the poorly suppressed HOMs. This combination of indicators is very discouraging. The specific manifestation of these problems will depend on the system itself. Poor HOM suppression means that unwanted modes excited by mode coupling or imperfect splicing will be amplified along with the signal, reducing beam quality and signal power. Amplified spontaneous emission (ASE) will be enhanced, roughly in proportion to the number of poorly suppressed HOMs for low-repetition-rate lasers (where ASE comes primarily from the steady-state periods between pulses). High-repetition rates lead to further enhancement of ASE by the dark region portions of the gain. In any case, the lack of mode discrimination means that it is very difficult to control light in such a fiber.

Improved Gain Interaction of Bend-Resistant, Gain-Producing, LMA Fiber Designs

In parent application Ser. No. 11/319,121, supra, I have proposed distortion resistant design with, for example, parabolically-graded and linearly-graded (cone-shaped) index cores. These designs demonstrated improvements over step-index designs in terms of simulated area, loss, and mode-coupling indicators. In accordance with my invention, I apply the gain-interaction model described above to these bend-resistant designs, showing that their distortion resistance leads to favorable amplifier performance metrics (gain interaction, bend loss, HOM suppression, and effective mode area) provided that design parameters (core size, total core contrast, grading depth, index profile shape and gain-dopant profile) are properly configured. By the terms bend-resistant fiber or distortion-resistant fiber, I refer to the degree to which the performance of a fiber is not adversely affected when the fiber is bent. In this description, that performance is measured principally by the following fiber performance characteristics: bend loss, bend distortion, HOM suppression, and gain interaction.

My approach to designing a distortion resistant LMA fiber is that light propagating in the bent segments of a fiber is primarily directly impacted by the equivalent index profile, not the material index profile. Light sees the latter in the much shorter straight segments of a typical packaged fiber. Therefore, the correct design approach is to optimize mode properties of the equivalent index profile, not of the material index profile (that is, to not ignore any of the important bend-distortion impacts). If a bend-induced index gradient is unavoidable, it can be canceled, at least over part of the core, by an opposite material index gradient as discussed in parent application Ser. No. 11/319,121, supra. Because of this cancellation, an appropriate graded-index profile 94 of the material index (FIG. 9A) results in an equivalent index profile 95 having a flat index peak 96 (FIG. 9B), in contrast to a SIF with equivalent index sharply peaked at the core edge (FIG. 4A, profile 45). A parabolic material index profile 94 is a particularly attractive special case because it has an equivalent index shape (curvature) at its peak that is largely bend invariant for typical bend radii. However, my simulations indicate that good performance can be achieved for a variety of shapes of the graded-index profile 94 (e.g., quadratic, linear), if the contrast, core diameter, and grading depth are configured according to the general principles outlined here.

The following discussion relates to LMA fibers in which the material index profile is not only parabolic but also has a step between the end of the graded profile and the cladding index. This generalization of the $\Delta n_g = \Delta n_c$ case [parent application Ser. No. 11/319,121 (Fini 2), supra] provides some independent control of distortion resistance (with changes in $\Delta n_g$), bend-loss resistance (with changes in $\Delta n_c$), and mode size (with changes in $R_c$). Note, in the parent application the terminology of $\Delta n_g$ and $\Delta n_c$ was not used, but independent degrees of freedom were described using different terminology: $\Delta n_c = n_{core} - n_{clad}$ and $\Delta n_g = A R_{core}$, where A is the slope of the index profile.

Figure 10A:
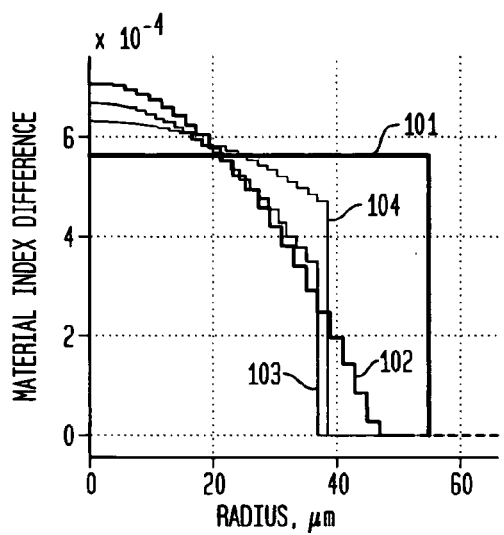
FIG. 10 shows a graph (FIG. 10A) of the material index profiles for a family of graded-index fiber designs (curves 102-104) and a SIF design (curve 101) and also shows a graph (FIG. 10B) of bend loss vs. $R_b$ for a fully-graded index profile. The ordinate of FIG. 10A is the difference between the fiber index at each radial position and the cladding index.

Computer simulations (FIGS. 10 & 11) demonstrate that LMA fibers with parabolic material index profiles (with and without a step) dramatically outperform the 110 μm SIF discussed above. To make comparison between fibers fair, and as clear as possible, I ran simulations of a family of such parabolic-index-profile fibers with different size steps but with identical effective mode-field area and bend loss (selected profiles 102-104 are shown in FIG. 10A). A spool radius $R_b$=15 cm is assumed, and all fibers in the family match $A_{eff}$=1100 μm² and bend loss 0.08 dB/m, which are the characteristics of the SIF example at this bent-fiber operating condition (wavelength 1060 nm). Since this set of parameters fixes two of the three degrees of freedom for the parabolic index profile, each fiber in the family is defined by a single parameter, $\Delta n_g/\Delta n_c$. Naturally, this family (FIG. 10A) includes the aforementioned 110 μm SIF ($\Delta n_g/\Delta n_c$=0; curve 101) and a fully-graded parabolic profile (with no step, $\Delta n_g/\Delta n_c$=1; curve 102). Actual simulated profiles approximate a smooth parabola with twenty four layers, each layer having a constant but different index.

Figure 10B:
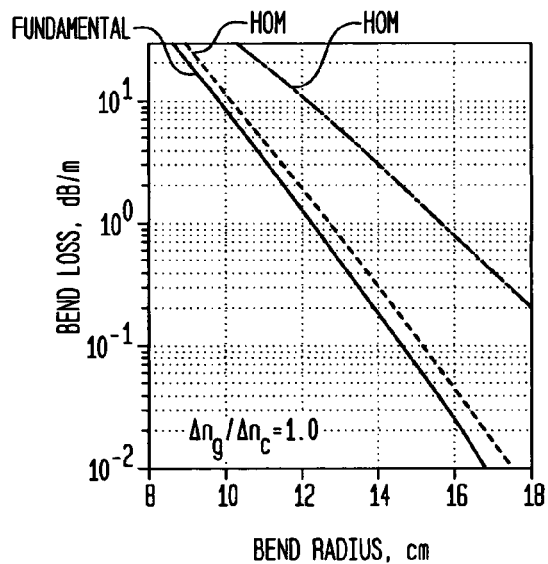
Figure 11A:
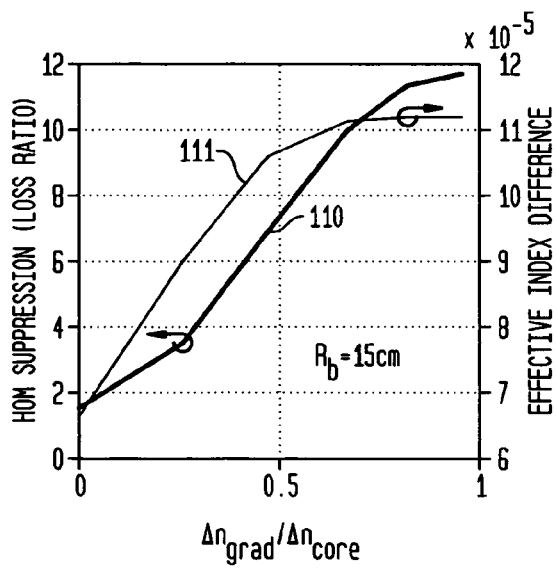
FIG. 11 shows a graph of HOM suppression and effective index difference, both vs. $\Delta n_g/\Delta n_c$ (FIG. 11A; $\Delta n_g=\Delta n_{grad}$; $\Delta n_c=\Delta n_{core}$), and a graph of dark fraction vs. $R_b$ (FIG. 11B)
Figure 11B:
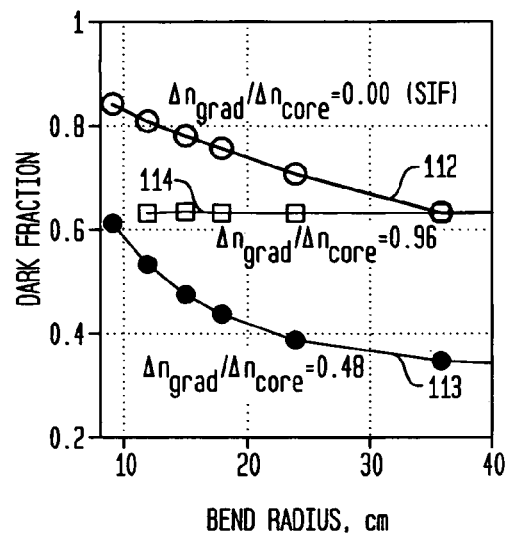
Figure 12A:
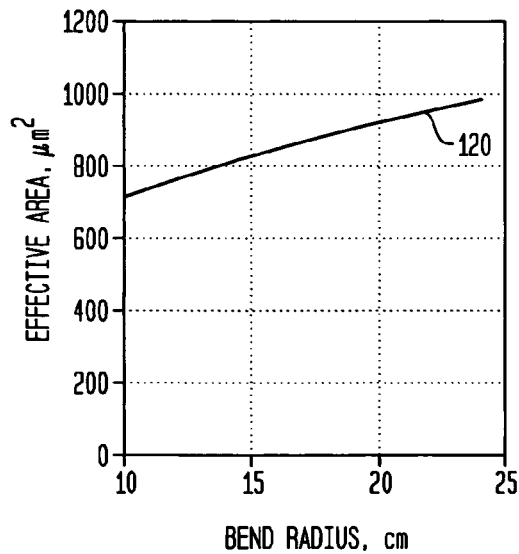
FIG. 12 shows graphs of $A_{\it eff}$ (FIG. 12A) and bend loss (FIG. 12B; curve 121 for the fundamental mode; curves 122 for HOMs), both vs. $R_b$ for an SIF with a 50 μm core and contrast $\Delta n_c$=0.00058.
Figure 12B:
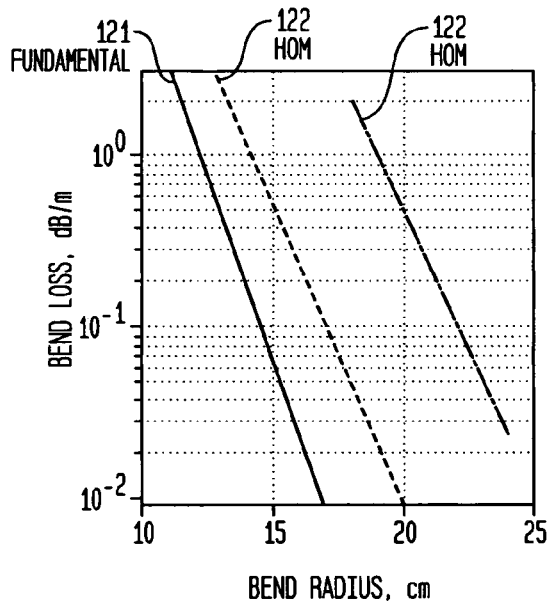

Calculated bend losses in FIG. 10B show that the fully-graded profile restores acceptable loss suppression of HOMs (while maintaining the same effective area and bend loss). In FIG. 11A the HOM loss suppression at $R_b$=15 cm is plotted again (curve 110) as a ratio of the fundamental mode loss, showing the dramatic improvement from under 2 for the SIF ($\Delta n_g/\Delta n_c$=0) to nearly 12 for the fully-graded profile ($\Delta n_g/\Delta n_c$=1). This plot also shows steady improvement in the effective index difference (curve 111) between the fundamental mode and the nearest HOM, an important metric of mode-coupling resistance (calculated for a straight fiber). The very small effective index differences for all fibers reflect a potentially severe mode-coupling problem, which is a typical symptom of extremely large mode area fibers, and one of the reasons why HOM suppression is important. Gain overlaps (not shown) still indicate essentially no differential gain for any of the fibers and therefore do not favor any designs. A preliminary comparison (FIG. 11B) shows substantially better dark fraction for the graded-index fibers (curves 113, 114) than for the SIF (curve 112), even in the special case $R_g$=$R_c$. The restriction $R_g$=$R_c$ means that dark fraction tends to favor narrower cores simply because a small core keeps all of the gain well confined to the center, where the signal light is. For this reason, differences in dark fraction (e.g., between $\Delta n_g/\Delta n_c$≈0 and $\Delta n_g/\Delta n_c$≈1) in FIG. 11B are largely artifacts of their different core radii. The more general case, where $R_g$ can be adjusted independently of $R_c$, favors graded-index designs (see, FIG. 15B, infra) that have a relatively large $R_c$. These graded-index designs keep light largely confined to a central illuminated portion of the core, with $R_g$<$R_c$, roughly corresponding to this central portion. A graded-index core is particularly effective when combined with the technique of tailoring the gain profile to interact with the signal light.

FIGS. 10 and 11 present a "fair" comparison under the assumption that $A_{eff}$=1100 μm² is in fact required at a bend radius of 15 cm. In another sense, the comparison may not seem fair, since the SIF in question suffers such extreme bend distortion. One SIF alternative is to simply use a smaller step-index core with more reasonable bend distortion, even though this means sacrificing $A_{eff}$. In fact, a step-index design with ~50 μm core diameter can achieve $A_{eff}$~800 m² at $R_b$=15 cm (curve 120, FIG. 12A), with comparable loss ratio (~10) and fundamental bend loss (~0.1 dB/m; curve 121, FIG. 12B) to the 1100 μm² parabolic index profile fiber discussed above. Despite their increased nonlinearities, these (or even smaller-core) fibers would perform much better than the 110 μm SIF in most amplifier applications. While one conclusion of the comparison is that bend-resistant designs offer some advantage, an equally important conclusion is that simply scaling up standard cores to greater and greater sizes eventually becomes impractical unless bend distortion has somehow been dealt with. My invention does just that.

Confined-Gain Designs: Tailoring the Gain Dopant Profile

Gain overlap and dark fraction were used above to describe the difficulty of achieving practical SIFs with extremely large mode-field areas and to demonstrate advantages of distortion-resistant fibers having graded-index profiles. These parameters are, of course, dependent on the gain profile, which has arbitrarily been assumed to be uniform, with a radius $R_g$=$R_c$. One established technique for improved amplifier fiber design is to adjust $R_g$ in a SIF so that the fundamental signal mode and the gain profile better coincide [Desurvire et al., JLWT (1990) and Oh et al., CLEO (2006), supra]. However, these papers do not address bend distortion, dark fraction, or graded-index profiles in their analysis, and, therefore, they do not provide direction for the proper configuration of $\Delta n_g$, $\Delta n_c$, $R_g$, and $R_c$ to achieve low bend loss, low bend distortion, low dark fraction, and HOM suppression.

One LMA SIF design is shown schematically in FIG. 5A. Here, the gain-producing fiber has a step-index core profile 11 of radius $R_c$, but the gain-dopant is confined to a central core region 14 with appropriately chosen $R_g$<$R_c$. Thus, the annular, peripheral core region 15 contains essentially no gain dopant (i.e., it is not intentionally gain doped). The gain-dopant profile 16 can be adjusted independently of the index profile 11 to better match the desired signal mode 10a or to suppress the HOM modes 12a.

Figure 13:
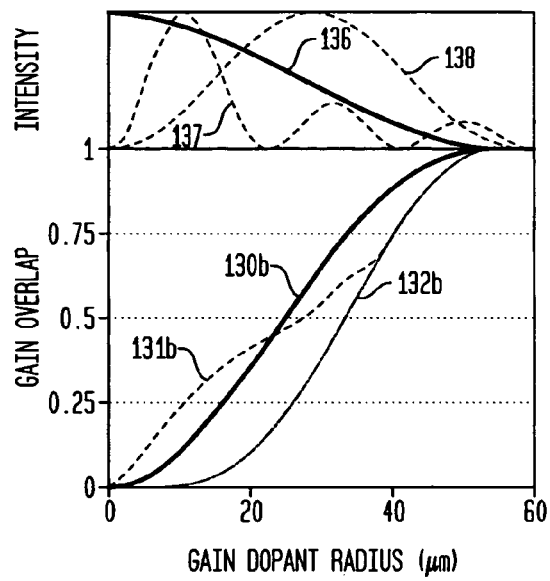
FIG. 13 shows graphs of the gain overlap (lower) and optical intensity (upper), both vs. radial position (radius)

In FIG. 13 simulated straight-fiber intensity vs. radius curves 136, 137, 138 are integrated to give gain overlap vs. radius curves 130b, 131b, 132b, plotted together, for the 110 μm SIF of FIG. 10A. With no bend, the fundamental mode gain overlap (solid curve 130b) is greater than the HOM gain overlaps (dashed curves 131b, 132b) for a range of gain-dopant radii>22 μm, indicating selective amplification of the fundamental mode over other modes. Thus, fiber 130 can preferentially reduce the gain overlap of the HOMs, thereby providing differential gain of the fundamental mode 136. In fact, such independent control of gain-dopant and index profiles may be achieved in practice by combining different dopants. For example, using a Ge up-dopant and F down-dopant together with a Yb gain-dopant, one may be able to achieve some independent control of gain and index profiles, provided that no significant fabrication limitations apply.

A straight-fiber mode simulation, shown in FIG. 13, of the 110 μm SIF discussed above illustrates the benefits of a confined gain region. The upper graph of mode intensity demonstrates that the fundamental mode 136 is fairly well confined to the center of the core, whereas representative HOMs 137, 138 are distributed farther out. Accordingly, integrating these intensity profiles gives large fundamental mode gain overlaps $g_{fund}/g_0$ (lower graph; curve 130b) for a fairly confined-dopant region, $R_g$~0.65$R_c$. HOM overlaps (lower graph, curves 131b, 132b) rise more slowly, so that their gain overlap can be significantly less. Even smaller values of $R_g$ may be desirable in some cases, if gain suppression is needed only for less than all of HOMs.

Figure 14A:
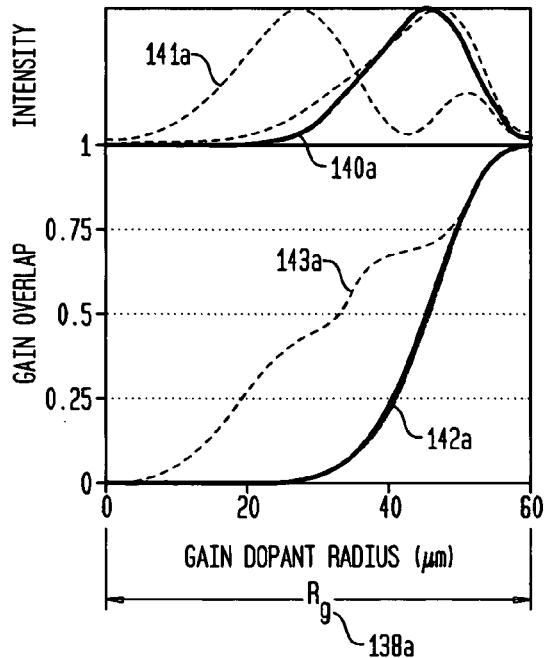
FIG. 14 shows graphs of gain overlap vs. radius for a large-core SIF (FIG. 14A) and a bend distortion-resistant LMA fiber in accordance with one embodiment of my invention (FIG. 14B)
Figure 14B:
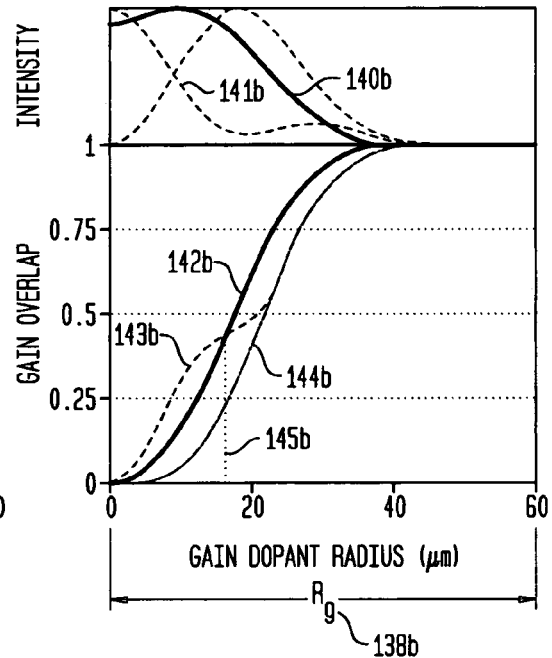

Clearly, the distortion evident in FIG. 1 disrupts this strategy when the same fiber is bent to a 15 cm radius. Bending the fiber pushes the fundamental mode far to the edge of the core, leading to poor overlap with gain dopants in the central region. This effect is confirmed in FIG. 14, showing intensity (now azimuthally averaged) versus radius, along with gain overlaps, over half of the gain profile region (i.e., gain regions 138a and 138b of FIG. 14A and FIG. 14B, respectively, depict only the portion of gain profile 16 of FIG. 5A that lies between the center of the core region and $R_g$ to the right).

In the large-core SIF (FIG. 14A) large bend distortion makes preferential gain essentially impossible. The fundamental mode intensity of the signal light (solid curve 140a) lies farther out than the HOMs (dashed curve 141a). On the other hand, the distortion-resistant graded-index design (FIG. 14B), in accordance with one embodiment of my invention, enables preferential gain, with fundamental mode gain overlap (solid curve 142b) greater than HOM overlap (dashed curves 143b, 144b). More specifically, as shown in FIG. 14A, the fundamental-mode gain overlap (curve 142a) rises only after gain overlap (e.g., curve 143a) for some HOMs (e.g., curve 141a) that are more centrally located than the fundamental mode (curve 140a). The best case for the SIF design is to adjust $R_g$ to be approximately equal to $R_c$, giving approximately zero differential gain. In contrast, if the gain dopants are confined too much in an SIF (e.g., $R_g$<15 μm; dashed line 145b, FIG. 14B), they will actually amplify HOMs preferentially (curve 143b) over the fundamental mode (curve 142b), a generally undesirable result.

Graded-index designs in accordance with my invention have a further important advantage over distortion-sensitive SIFs; that is, the former reduce the displacement of the fundamental mode out of a confined gain region. Thus, the (azimuthally averaged) fundamental mode intensity for a bent, fully-graded fiber (curve 140b; FIG. 14B), in accordance with one embodiment of my invention, is only slightly displaced within the gain dopant region 138b of radius $R_g$. Since the fundamental mode is fairly well confined to the central core, a range of confined-dopant radii $R_g$>17 μm achieve differential gain of the fundamental mode, indicated by the solid (fundamental) gain overlap curve 142b rising above the dashed (HOM) curves 143b, 144b.

Figure 15A:
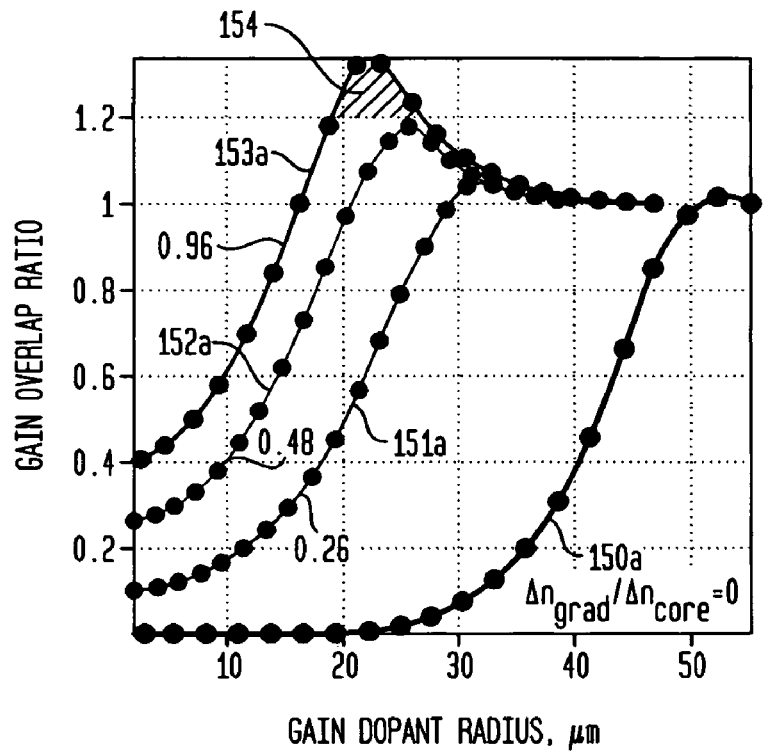
FIG. 15 shows a graph of gain overlap ratio vs. radius (FIG. 15A) for a family of grading-depth fractions ($\Delta n_g/\Delta n_c$), as well as a graph of dark fraction (curve 150b) and gain overlap (curve 151b) both vs. radius (FIG. 15B)
Figure 15B:
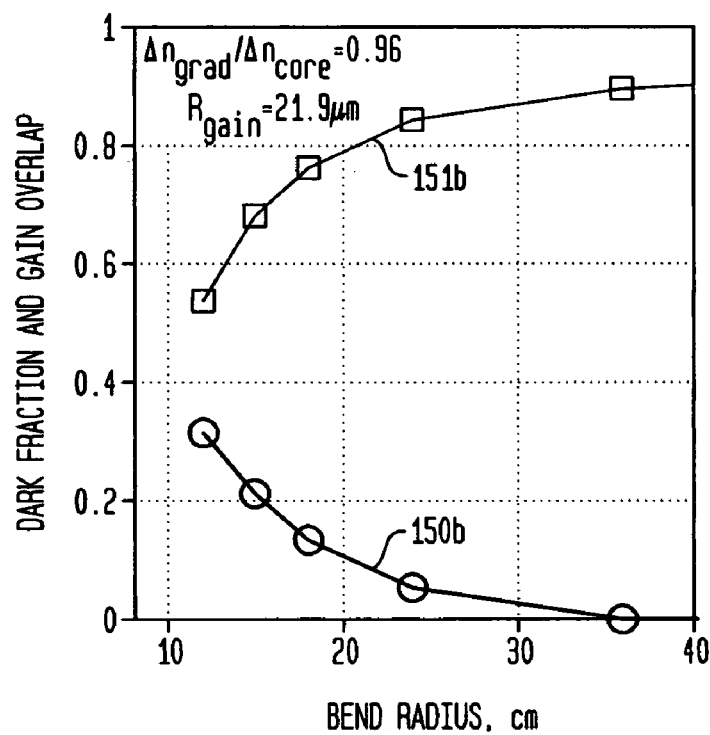

This point is perhaps clearer in FIG. 15A, which demonstrates that graded-index designs in accordance with my invention can provide differential gain and significant HOM suppression if the gain region radius $R_g$ is chosen carefully. In FIG. 15A the gain overlap ratio is plotted against gain region radius $R_g$ for an SIF and for three graded-index fibers in accordance with various embodiments of my invention. The gain overlap ratio is defined as the ratio of the fundamental gain overlap to the highest HOM gain overlap. As we have seen, the SIF has fundamental gain overlap (curve 150a; FIG. 15A) less than the HOM overlap (ratio<1) for all substantially confined gain profiles and finally achieves about zero differential gain (ratio=1) when the core and gain regions are coextensive ($R_c$=$R_g$=50 μm). The graded-index fibers (curves 151a, 152a, 153a) reach peak gain overlap ratios significantly above unity (e.g., peak ratio~1.3, curve 153a). The largest differential gain is seen for the nearly fully-graded fiber (curve 153a) with $R_c$=22 μm; that is, the fiber exhibits the largest differential within the shaded area 154 where $R_g$=19-26 μm and the overlap ratio is greater than ~1.2. These overlap ratios (curve 150b; FIG. 15B) at $R_b$=15 cm indicate preferential gain of the fundamental mode for the graded-index fibers and improve as the degree of gradation increases. This preferential gain can be translated into several decibels of HOM suppression in a realistic amplifier. For example, if total fundamental gain is 20 dB, then, the simplistic overlap estimate of relative HOM suppression is $(20\text{ dB}) \times (g_{fund} - g_{HOM})/g_{fund}$ ≈4.6 dB. Although not huge, this degree of suppression is very helpful, considering that bend loss can provide only roughly 10 dB of total HOM suppression before fundamental mode losses become unacceptable. (If fundamental bend loss is ~1 dB, HOM bend loss is ~1 dB times the loss ratio, ~10.)

Combining a graded-index profile and a confined gain dopant design also greatly improves the dark fraction. Simulation of a fully-graded fiber with peak gain overlap ratio ($\Delta n_g \approx \Delta n_c$, $R_g$~22 μm) shows very favorable performance by all indicators. FIG. 15B shows low dark fraction (curve 150b) and high-gain overlap (curve 151b) for bend radii down to about 15 cm, in addition to the good HOM loss suppression and mode coupling resistance shown in FIG. 11.

Thus, a fully-graded design (i.e., $\Delta n_g \sim \Delta n_c$) with a confined dopant $R_g$~22 μm simultaneously achieves low dark fraction (FIG. 15B, curve 150b) and high gain overlap (curve 151b) for the target range of bend radii. While peak gain ratio may occur at a single $R_g$, the benefit of gain suppression of HOMs can be obtained over a wider range $R_g$=19-26 μm (or even $R_g$=18-30 μm, where the gain overlap ratio is greater than ~1.1; stated more generally, suitable gain radii are defined by $0.42 \leq R_g/R_{mode} \leq 1.6$). This example illustrates the principles of design, but particular applications may indicate that more or less emphasis be placed on various amplifier performance indicators, including gain overlap fraction, effective area, etc.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

Applications

Figure 22:
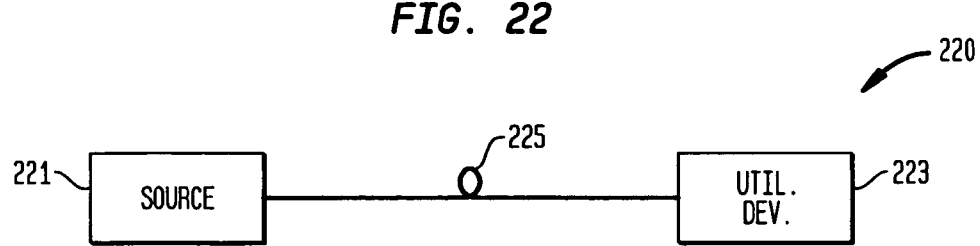
FIG. 22 is a schematic, block diagram of an optical system, subsystem, apparatus, link, or the like that incorporates an LMA fiber in accordance with one embodiment of my invention.

One application of my invention is depicted in FIG. 22, an optical system, sub-system, optical link or apparatus 190 including an optical source 191 coupled to a utilization device 193 by means of an optical fiber 195 designed in accordance with my invention. Optical source 191 may be a single light source or a multiplicity of sources. Illustratively source 191 is a laser (e.g., a fiber laser or a semiconductor laser) or an LED (light-emitting diode). On the other hand, utilization device 193 may be an active device, a passive device, or may include both. As an illustration of active devices, utilization device 193 may be a relatively simple photodetector (e.g., a p-i-n photodiode, an avalanche photodiode or other form of optical sensor), or it may be a relatively more complex piece of equipment (e.g., a receiver, transceiver, modulator, or amplifier). As an illustration of passive devices, utilization device may be an optical coupler, multiplexer or simply another piece of fiber.

Figure 23:
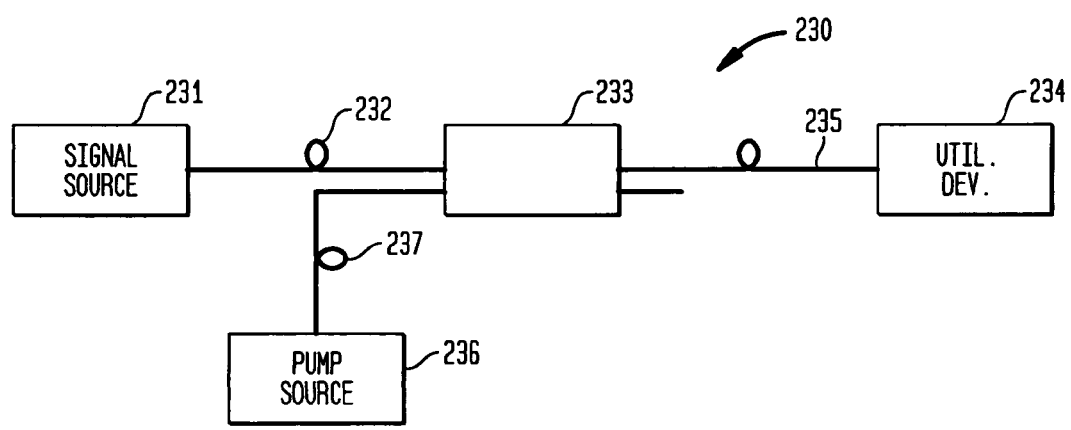
FIG. 23 is a schematic, block diagram of an optical fiber amplifier that incorporates a bend-resistant LMA fiber in accordance with another embodiment of my invention.

Another application of my invention is depicted in FIG. 23, an optical fiber amplifier 230 comprising gain-producing optical fiber (GPF) 235, which optically couples a coupling device 233 and a utilization device 234. GPF 235 is designed in accordance with my invention. In telecommunication applications device 233 is known as a wavelength division multiplexer; in high power non-telecommunications applications it is known as a pump-combiner. For simplicity, hereinafter we will describe our invention in the context of high power non-telecommunications applications. In this case, the pump-combiner 233 couples the outputs of an optical input signal source 231 and an optical pump source 236 into the GPF 235. The input signal source 231 generates a first-wavelength optical input signal, which is coupled to an input of a pump combiner 233 via a conventional fiber 232, whereas the pump source 236 generates a second-wavelength optical pump signal, which is coupled by a conventional fiber 237 to another input of pump combiner 233.

As is well known in the art, the pump signal generates a population inversion in the GPF 12, which amplifies the input signal from input source 231. The amplified input signal propagates along GPF 12 to utilization device 234. In high power applications the latter may include a myriad of well known devices or apparatuses; e.g., another optical amplifier, a beam collimator, a lens system, a work piece (e.g., for cutting or welding); whereas in telecommunications applications, utilization device 234 may include an optical receiver, an optical modulator, an optical coupler or splitter, or a piece of terminal equipment. Some of these may be coupled to the GPF 232 via a standard pigtail connector (not shown).

Illustratively, the input source 231 is a laser that generates a relatively low power optical input signal at a wavelength in the amplification range of the GPF 232, whereas the pump source 236 is a semiconductor light emitting diode (LED) or an array of LEDs that generates a relatively high optical power (e.g., above about 150 mW) pump signal at a shorter wavelength that produces the desired amplification of the input signal. Illustratively, the GPF 232 is rare-earth-doped fiber (e.g., preferably a ytterbium-doped fiber) or a chromium-doped fiber. In the preferred ytterbium fiber case, the signal source 231 generates an input signal having a wavelength of about 1080 nm, and the pump source 236 generates a pump signal at a wavelength of about 915 nm, or alternatively at about 975 nm. It is noted here that a semiconductor laser may also be used as a pump source, but an LED, especially an array of LEDs, is preferred because more total light can be coupled into the fiber with an LED.

Although the amplifier 230 of FIG. 23 depicts a common co-propagating pump configuration (i.e., the pump and input signals propagate in the same direction through the GPF), it is also possible to use a counter-propagating configuration (i.e., the pump and input signals propagate in opposite directions through the GPF). In addition, a multiplicity of amplifiers may be arranged in tandem, a scheme that is well known in the art for increasing the total gain of a high power multi-stage system. Pump energy may also be transversely coupled into the amplifier.

In addition, when provided with a suitable, well-known optical resonator (e.g., a pair of spaced apart fiber gratings) the GPF may function as a laser.

I claim:

1. A large mode area, gain-producing optical fiber comprising:
    a core region having a longitudinal axis, and
    a cladding region surrounding said core region, said core and cladding regions configured to support and guide the propagation of signal light in a fundamental transverse mode in said core region in the direction of said axis, said core region having a graded index profile in a radial cross-section thereof, a core radius $R_c$ a core contrast $\Delta n_c$, and a grading depth $\Delta n_g$, and said mode having an effective mode-field area $A°_{eff}$ when said fiber is straight, wherein $\Delta n_c$, $\Delta n_g$, and $R_c$ are selected such that when said fiber is bent to a radius $R_b$, said fiber has sufficiently suppressed higher-order modes, and resists bend-induced degradation of gain interaction while exhibiting no less than a predetermined level of effective mode area $A_{eff}$, and exhibiting no more than a predetermined level of bend loss, said suppression of higher-order modes (HOM) being roughly 10 dB or more relative to the fundamental mode, wherein said resistance to bend-induced degradation of gain interaction is achieved by configuring $\Delta n_g$ such that the bend-induced displacement of the fundamental transverse mode is less than about 0.85 times the radius of the mode.

2. The fiber of claim 1, wherein said bend-induced degradation of gain interaction is measured by the ratio of the effective mode area of said fiber when bent at said bend radius to the effective mode area of said fiber when straight, and $\Delta n_c$, $\Delta n_g$, and $R_c$ are configured so that said ratio is greater than approximately 0.5.

3. The fiber of claim 1, wherein said signal light is guided in a fundamental mode, and wherein $\Delta n_c$, $\Delta n_g$, and $R_c$ are configured so that the displacement of said mode, when said fiber is bent at said bend radius, is less than about 0.85 times the radius of said mode.

4. The fiber of claim 1, wherein $0.5 \leq \Delta n_g/\Delta n_c \leq 1.0$ and $75 \mu m \leq 2R_c \leq 95 \mu m$.

5. The fiber of claim 1, wherein the effective mode area of said fiber when bent at said bend radius is greater than approximately 800 $\mu m^2$.

6. The fiber of claim 1, wherein said core region includes a gain region of radius $R_g < R_c$, said gain region including a central illuminated region in which intensity of said signal light exceeds a predetermined threshold and a peripheral dark region in which the intensity of said signal light does not exceed said threshold, said dark region being configured to be less than about 30% of the area of said gain region.

7. The fiber of claim 6, wherein said bend distortion is measured by the ratio of the effective mode area of said fiber when bent at said bend radius and to the effective mode area of said fiber when straight, and $\Delta n_c$, $\Delta n_g$, and $R_c$ are configured so that said ratio is greater than approximately 0.8.

8. The fiber of claim 6, wherein said signal light is guided in a fundamental mode, and wherein $\Delta n_c$, $\Delta n_g$, and $R_c$ are configured so that the radial displacement of said mode, when said fiber is bent at said bend radius, is less than about 0.2 times the radius of said mode.

9. The fiber of claim 1, wherein said signal light is guided in a fundamental mode, and wherein $\Delta n_c$, $\Delta n_g$, and $R_c$ are configured so that gain overlap of the said fundamental mode is greater than approximately 1.1 times gain overlap of any other mode, $\Delta n_c/\Delta n_g$ is about 0.1.0, and $0.42 \leq R_g/R_{mode} \leq 1.6$, where gain overlap is defined as the fraction of a mode that overlaps said gain region.

10. An optical system comprising:
    an optical source,
    a utilization device, and
    an optical fiber according to claim 1 coupling said source to said utilization device.

11. An optical amplifier comprising:
    a gain-producing optical fiber according to claim 1 for amplifying said signal light in response to optical pump energy applied thereto,
    a source of said pump energy, and
    a coupler for coupling said pump energy and said optical signal light into said optical fiber.

* * * * *